United States Patent
Hirata

(10) Patent No.: US 9,491,696 B2
(45) Date of Patent: Nov. 8, 2016

(54) RADIO COMMUNICATION SYSTEM, MOBILE TERMINAL, BASE STATION, AND STORAGE UNIT FOR MOBILE TERMINAL

(71) Applicant: FUJITSU LIMITED, Kawasaki-shi, Kanagawa (JP)

(72) Inventor: Akira Hirata, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 67 days.

(21) Appl. No.: 14/295,588

(22) Filed: Jun. 4, 2014

(65) Prior Publication Data

US 2014/0286264 A1  Sep. 25, 2014

Related U.S. Application Data

(63) Continuation of application No. PCT/JP2011/078527, filed on Dec. 9, 2011.

(51) Int. Cl.
| | | |
|---|---|---|
| *H04W 48/20* | (2009.01) | |
| *H04W 48/18* | (2009.01) | |
| *H04W 72/04* | (2009.01) | |
| H04W 84/04 | (2009.01) | |

(52) U.S. Cl.
CPC ............ *H04W 48/20* (2013.01); *H04W 48/18* (2013.01); *H04W 72/0486* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 8,340,705 B2 | 12/2012 | Liu et al. | |
| 2009/0070694 A1 | 3/2009 | Ore et al. | |
| 2010/0130215 A1* | 5/2010 | Jung | H04W 48/02 455/450 |
| 2011/0039594 A1* | 2/2011 | Liu | H04W 48/02 455/515 |
| 2011/0110227 A1 | 5/2011 | Yang et al. | |
| 2011/0111757 A1 | 5/2011 | Venkatachalam et al. | |
| 2011/0143738 A1* | 6/2011 | Kone | H04W 48/16 455/418 |
| 2011/0171915 A1* | 7/2011 | Gomes | H04W 24/10 455/73 |
| 2011/0218004 A1 | 9/2011 | Catovic et al. | |
| 2011/0292895 A1 | 12/2011 | Wager et al. | |
| 2012/0106349 A1* | 5/2012 | Adjakple | H04W 52/0206 370/241 |
| 2012/0213161 A1 | 8/2012 | Maeda et al. | |

FOREIGN PATENT DOCUMENTS

| | | |
|---|---|---|
| GB | 2475130 | 5/2011 |
| GB | 2475134 | 5/2011 |
| GB | 2475157 | 5/2011 |
| GB | 2475165 | 5/2011 |
| GB | 2475171 | 5/2011 |

(Continued)

OTHER PUBLICATIONS

JPOA—Office Action of Japanese Patent Application No. 2013-548031 dated Jun. 2, 2015, with English translation of the relevant part, pp. 1-2 of the Office Action.

(Continued)

*Primary Examiner* — Donald Mills
(74) *Attorney, Agent, or Firm* — Fujitsu Patent Center

(57) ABSTRACT

A mobile terminal transmits a first message to a hybrid cell base station, the first message indicating the presence of the mobile terminal trying to establish a connection, the first message containing information unique to the mobile terminal. The hybrid cell base station receives the first message, and transmits a first response message in response to the first message to the mobile terminal.

9 Claims, 32 Drawing Sheets

(56) References Cited

FOREIGN PATENT DOCUMENTS

| GB | 2475392 | 5/2011 |
|---|---|---|
| JP | 2011-041281 | 2/2011 |
| JP | 2011-103646 | 5/2011 |
| WO | 2011/052190 | 5/2011 |

OTHER PUBLICATIONS

3GPP, TS 36.300, V9.5.0 (Sep. 2010), Subclause10.5.1.2.—3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 9).
3GPP, TS 36.213, V9.3.0 (Sep. 2010), Clause 6—3rd Generation Partnership Project; Technical Specification Group Radio Access Network; Evolved Universal Terrestrial Radio Access (E-UTRA); Physical layer procedures (Release 9).
International Search Report, mailed in connection with PCT/JP2011/078527 and mailed Jan. 24, 2012.
EESR—Extended European Search Report for European Patent Application No. 11876942.1 dated Sep. 16, 2015.
Mouly M et al: "The GSM system for mobile communications", Jan. 1, 1992 (Jan. 1, 1992), GSM System for Mobile Communications. Comprehensive Overview of the European Digital Cellular Systems, Cell & Sys, France, pp. 366-384, XP002194765, ISBN: 978-2-9507190-0-3, pp. 366-374.
Huawei: "Access Priority Control at Hybrid Mode H(e)NB", 3GPP Draft; S2-092209 Access Priority Control At Hybrid Mode H(E)NB, 3rd Generation Partnership Project (3GPP), Mobile Competence Centre; 650, Route Des Lucioles; F-06921 Sophia-Antipolis Cedex; France, No. Hangzhou; 20090324, Mar. 24, 2009 (Mar. 24, 2009), XP050345507, [retrieved on Mar. 24, 2009] pp. 1-2.

* cited by examiner

FIG. 1

```
SystemInformationBlockType1 ::=   SEQUENCE {
cellAccessRelatedInfo             SEQUENCE {
    . . .
    csg-Indication                BOOLEAN
    csg-Identity                  CSG-Identity         OPTIONAL -- Need OR
}
```

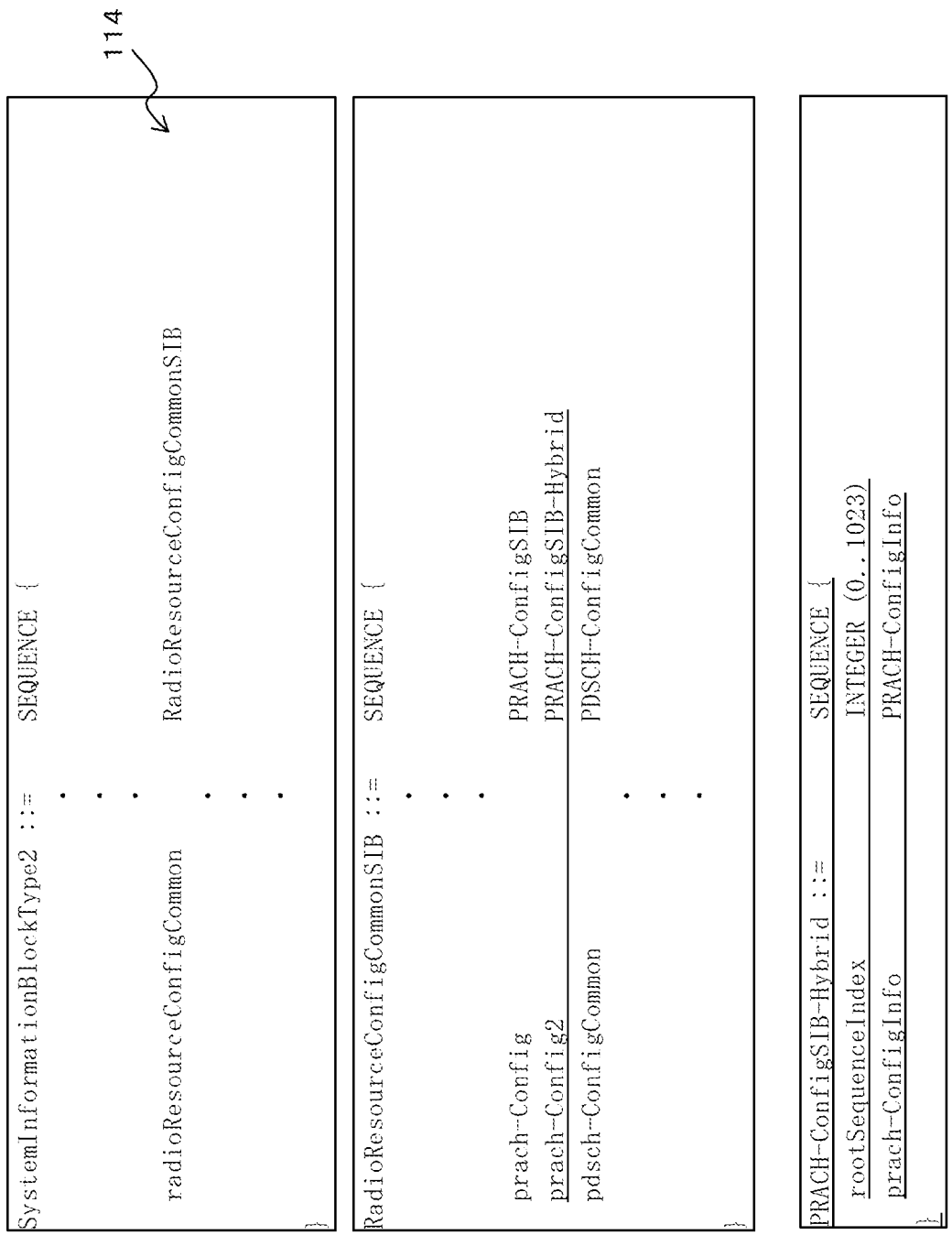

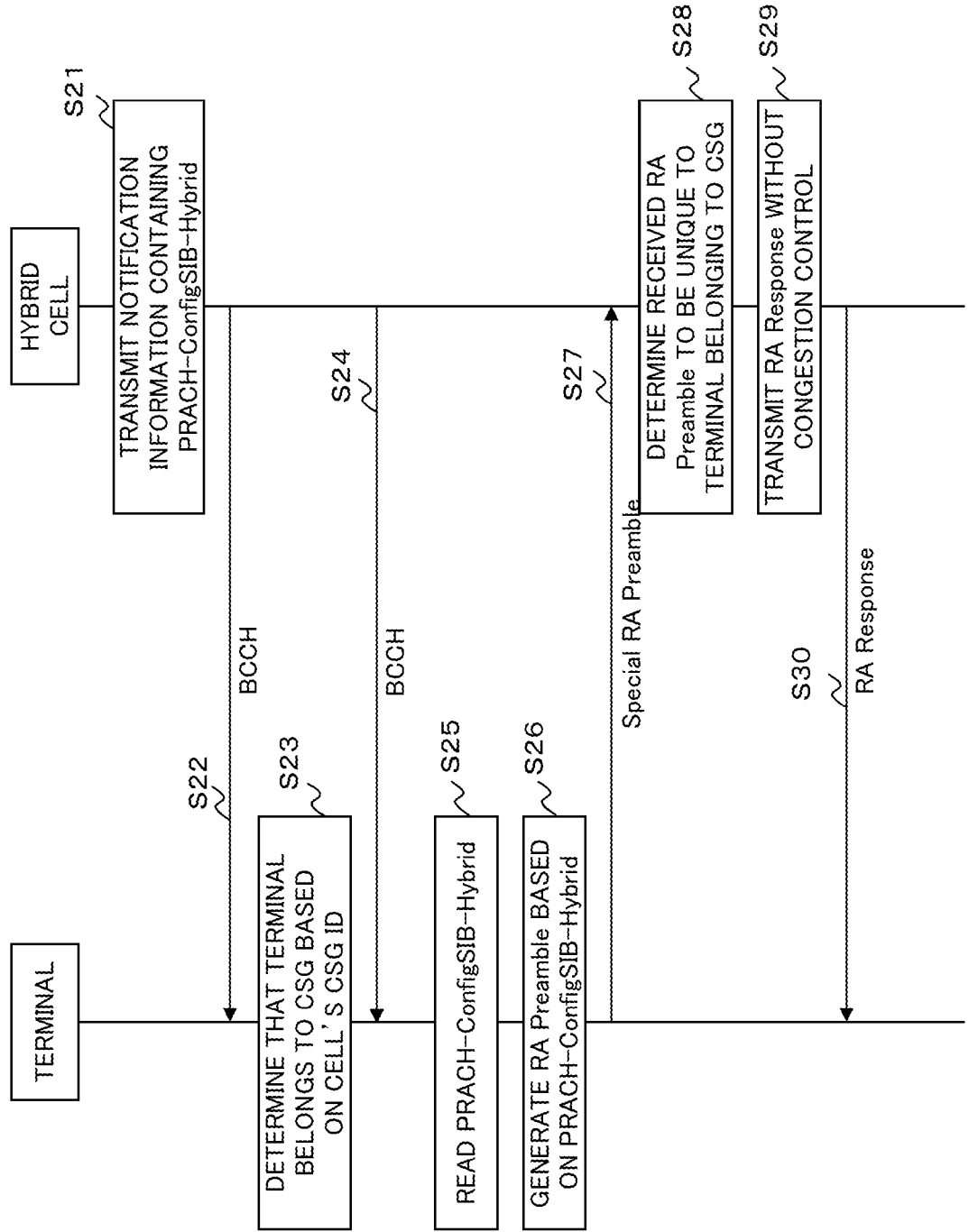

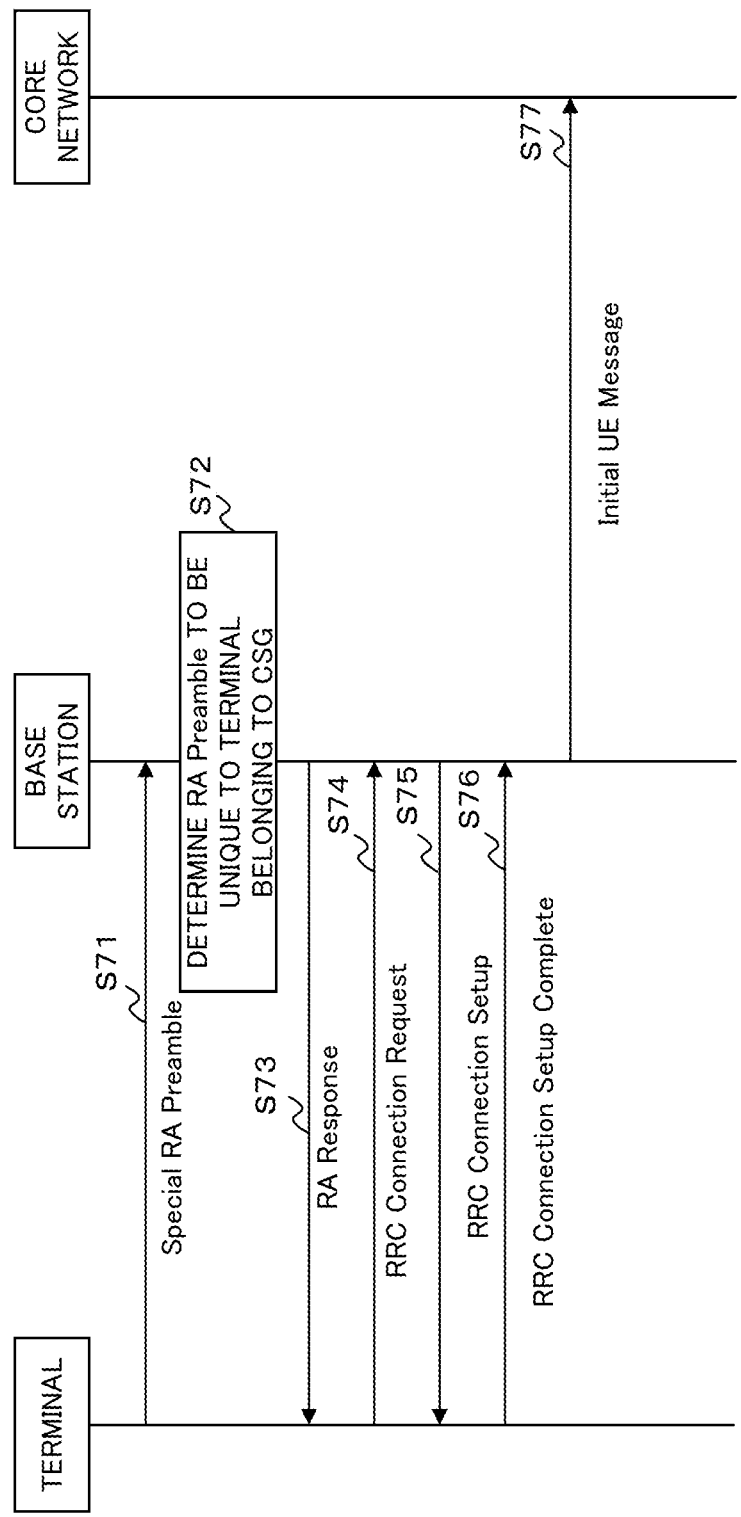

FIG. 11A

```
SystemInformationBlockType2 ::=    SEQUENCE {
         . . . . .
    radioResourceConfigCommon       RadioResourceConfigCommonSIB
}
```

FIG. 11B

```
RadioResourceConfigCommonSIB ::=   SEQUENCE {
         . . . . .
    prach-Config                    PRACH-ConfigSIB
}
```

FIG. 11C

```
PRACH-ConfigSIB ::=                SEQUENCE {
    rootSequenceIndex               INTEGER (0..1023)
    prach-ConfigInfo                PRACH-ConfigInfo
    rootSequenceIndex-Hybrid        INTEGER (0..1023)
    prach-ConfigInfo-Hybrid         PRACH-ConfigInfo
}
```

FIG. 18

| Identifier: '4F81' | | Structure: linear fixed | | Optional |
|---|---|---|---|---|
| SFI: '01' | | | | |
| Record length: X | | Update activity: low | | |
| Bytes | Description' | M/O | Length | |
| 1 to X | CSG Lists TLV object | M | X bytes | |

FIG. 19

| Description | Value | M/O | Length |
|---|---|---|---|
| CSG List Tag | 'A0' | M | 1 |
| Length | Y | M | according to ISO/IEC 8825 |
| PLMN Tag | '80' | M | 1 |
| Length | A | M | according to ISO/IEC 8825 |
| PLMN | -- | M | A |
| CSG Information Tag | '81' | M | 1 |
| Length | W | M | according to ISO/IEC 8825 |
| CSG Information | - | M | W+N |

FIG. 20

|   | | M | 1 |
|---|---|---|---|
| 1 | CSG Type indication | M | 1 |
| 2 | HNB Name indication | M | 1 |
| 3 to W | CSG ID | M | W-2 |
| W+1 to N | PRACH CONFIG | M | N |

FIG. 26A
```
RRCConnectionRequest ::=        SEQUENCE {
    criticalExtensions CHOICE {
        rrcConnectionRequest-r8     RRCConnectionRequest-r8-IEs,
        criticalExtensionsFuture    SEQUENCE {}
    }
}
```

FIG. 26B
```
RRCConnectionRequest-r8-IEs ::= SEQUENCE {
    ue-Identity         InitialUE-Identity,
    establishmentCause  EstablishmentCause,
    spare               BIT STRING (SIZE (1))
}
```

FIG. 26C
```
InitialUE-Identity ::= CHOICE {
    s-TMSI        S-TMSI,
    randomValue   BIT STRING (SIZE (40))
}
```

FIG. 26D
```
S-TMSI ::=         SEQUENCE {
    Mmec           MMEC,
    m-TMSI         BIT STRING (SIZE (32))
}
```

FIG. 27A

```
RRCConnectionSetupComplete ::=      SEQUENCE {
    rrc-TransactionIdentifier       RRC-TransactionIdentifier,
    criticalExtensions              CHOICE {
        c1 CHOICE{
            rrcConnectionSetupComplete-r8   RRCConnectionSetupComplete-r8-IEs,
        },
        criticalExtensionsFuture    SEQUENCE {}
    }
}
```

FIG. 27B

```
RRCConnectionSetupComplete-r8-IEs ::=   SEQUENCE {
    selectedPLMN-Identity               INTEGER (1..6),
    registeredMME                       RegisteredMME               OPTIONAL,
    dedicatedInfoNAS                    DedicatedInfoNAS,
    nonCriticalExtension                RRCConnectionSetupComplete-v8a0-IEs
OPTIONAL
}
```

FIG. 27C

```
RegisteredMME ::=       SEQUENCE {
    plmn-Identity       PLMN-Identity           OPTIONAL,
    mmegi               BIT STRING (SIZE (16)),
    mmec                MMEC
}
```

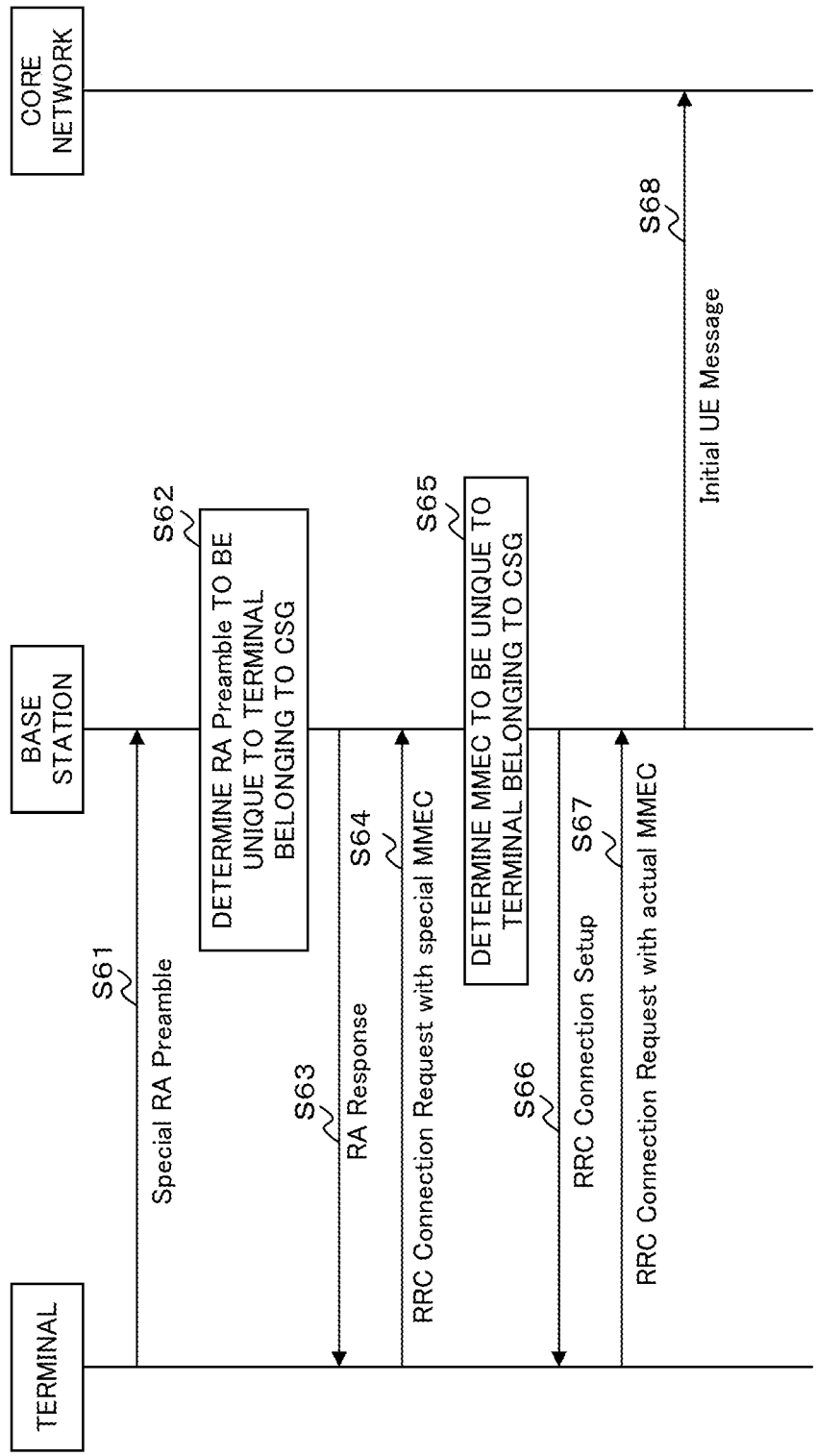

RADIO COMMUNICATION SYSTEM, MOBILE TERMINAL, BASE STATION, AND STORAGE UNIT FOR MOBILE TERMINAL

CROSS-REFERENCE TO RELATED APPLICATION

This application is a continuation application of International Application PCT/JP2011/078527, filed on Dec. 9, 2011 and designated the U.S., the entire contents of which are incorporated herein by reference.

FIELD

The present invention relates to a radio communication system, a mobile terminal, a base station, and a storage unit for the mobile terminal.

BACKGROUND

In a conventional radio communication system, radio base stations (hereinafter, merely referred to as "base stations") are systematically disposed to cover individual service areas. If multiple mobile terminals are located in a single service area, the mobile terminals share the radio resources to communicate with the base station. The service areas are called macrocells.

In recent years, some homes and offices have considered installation of base stations accessible only from/to specified mobile terminals at appropriate sites.

The Long Term Evolution (LTE) Release 8 standard, for example, involves femtocells each covering a relatively small area of several meters to tens of meters in addition to the macrocells.

A standardized example of the femtocell is a CSG cell accessible only from mobile terminals belonging to a group of preregistered mobile terminals (closed subscriber group; CSG).

As described above, a mobile terminal not belonging to a CSG cannot access the CSG cell. If such a mobile terminal could access the CSG cell, the convenience of the system would increase. For example, the connection to a CSG cell may provide higher communication quality than that of a macrocell in an area around the macrocell, and lead to effective use of the radio resources of the base station.

The LTE Release 9 standard involves hybrid cells accessible from/to not only mobile terminals belonging to the CSG but also mobile terminals not belonging to the CSG.

Although mobile terminals not belonging to the CSG are disadvantageous in terms of the quality of service (QoS) control and services in the hybrid cell, they can access the CSG cell, like a macrocell.

The CSG cell and the hybrid cell each transmit notification information containing a unique identifier (CSGID; csg-Identity) to all the mobile terminals therearound, to notify the mobile terminals that the cell is a CSG cell.

The mobile terminals determine whether the received notification information is transmitted from a CSG cell or hybrid cell on the basis of the unique identifier.

In specific, the mobile terminals determine whether the base station is a hybrid cell or CSG cell on the basis of csg-Indication, which is a Boolean parameter contained in System Information Block Type 1 (SIB1) in the notification information transmitted from the base station.

FIG. 1 illustrates example information contained in notification information SIB1 transmitted from a base station.

Each mobile terminal stores a list of CSGIDs (CSG white list) corresponding to CSG cells and hybrid cells accessible to the mobile terminal in a storage built in the mobile terminal, for example.

The mobile terminal compares a CSGID contained in notification information from a neighboring CSG cell or hybrid cell with its CSG white list to determine whether the mobile terminal belongs to the CSG of the CSG cell or hybrid cell.

If a mobile terminal located in a macrocell enters the coverage of a CSG cell or hybrid cell in a radio resource control connected (RRC CONNECTED) mode to the macrocell, the system executes a handover to the CSG cell or hybrid cell according to the process illustrated in FIG. 2.

FIG. 2 illustrates the process of a handover of a mobile terminal in an RRC CONNECTED mode to a CSG cell or hybrid cell.

A macrocell having a neighboring CSG cell or hybrid cell transmits an RRC Reconfiguration containing information on the neighboring cell (Report Proximity Config) to a mobile terminal connected to the macrocell (Step S1001).

The mobile terminal receives the RRC Reconfiguration and reads the CSGID of the neighboring cell on the basis of notification information from the neighboring cell.

The mobile terminal, which reads the CSGID of the neighboring cell on the basis of the notification information, refers to its CSG white list. If the mobile terminal determines the presence of a neighboring CSG cell or hybrid cell accessible to the mobile terminal, the terminal transmits a Proximity Indication containing a message (entering) indicating the determined results to the macrocell (Step S1002).

The macrocell receives the Proximity Indication; and transmits an RRC Reconfiguration containing Measurement Config, which is required for the mobile terminal to measure cell information on the CSG cell or hybrid cell, to the mobile terminal (Step S1003).

The mobile terminal receives the RRC Reconfiguration. If any event leading to a handover occurs, the mobile terminal reads the physical cell ID (PCI) of the CSG cell or hybrid cell on the basis of the notification information therefrom, and transmits a Measurement Report containing the PCI to the macrocell (Step S1004).

The macrocell receives the Measurement Report. If the macrocell determines that the reported PCI belongs to the CSG cell or hybrid cell, the macrocell transmits an RRC Reconfiguration containing a System Information (SI) Request to the mobile terminal (Step S1005).

The mobile terminal receives the RRC Reconfiguration, and reads the SI on the notification information from the CSG cell or hybrid cell (Step S1006).

The mobile terminal, which reads the SI on the notification information, transmits a Measurement Report, which contains the cell global ID (CGI), tracking area ID (TAI), and CSGID of the CSG cell or hybrid cell, to the macrocell (Step S1007).

The macrocell receives the Measurement Report, transmits a handover request to a mobility management entity (MME) (Step S1008), and executes a handover procedure (Step S1009). This process is defined in Non Patent Literature 1 below, for example.

In contrast, if a mobile terminal trying to connect to a cell is in a radio resource control idle (RRC IDLE) mode, the mobile terminal performs an initial access, one of the random access procedures, according to the process illustrated in FIG. 3, regardless of whether the cell is a CSG cell.

Before the start of communication between a base station and a mobile terminal, a radio communication system prepares a channel used for the start of transmission from the mobile terminal to the base station. In a 3GPP standard, the channel is called random access channel (RACH), and the process of starting communication through the RACH is called random access (RA).

In specific, upon the start of communication, the base station and the mobile terminal perform a communication process called random access procedure to establish a connection between the base station and the mobile terminal. In other words, the base station and the mobile terminal establish communication therebetween. The first signal that the mobile terminal transmits to the base station in the random access procedure is called Random Access (RA) Preamble.

FIG. 3 illustrates the process of an initial access performed by a mobile terminal in an RRC IDLE mode.

Upon trying to connect to a cell, the mobile terminal reads notification information transmitted from the cell.

The mobile terminal then generates an RA Preamble on the basis of prach-Config contained in the read notification information, and transmits the RA Preamble to the cell (Step S1011).

The cell receives the RA Preamble from the mobile terminal. If the cell accepts the mobile terminal, the cell transmits an RA Response to the mobile terminal (Step S1012).

The mobile terminal receives the RA Response from the cell, and transmits an RRC Connection Request to establish a radio resource control connection (RRC connection) to the cell (Step S1013). The RRC Connection Request is a message, from a mobile terminal trying to connect to a base station, for requesting the base station to allocate the radio resources.

The cell receives the RRC Connection Request from the mobile terminal, and transmits an RRC Connection Setup to the mobile terminal (Step S1014).

The mobile terminal receives the RRC Connection Setup from the cell, and transmits an RRC Connection Setup Complete to the base station to establish a radio resource control connection (Step S1015).

The base station receives the RRC Connection Setup Complete from the mobile terminal, and transmits an Initial User Equipment (UE) message to a core network including a verifier, such as a home subscriber server (HSS) (Step S1016). This process is defined in Non Patent Literature 2 below, for example.

The RA Preamble is a message, from a mobile terminal trying to connect to a base station, for notifying the base station of the presence of the mobile terminal within the coverage of the base station, as described above. Upon receiving the RA Preamble, the base station is informed only of the presence of a mobile terminal trying to connect to the base station, and cannot obtain information on the mobile terminal. In other words, the base station cannot determine whether the mobile terminal belongs to the CSG of the base station.

If a mobile terminal belonging to the CSG enters the coverage of a hybrid cell in the radio resource control connected mode, and if any event leading to a handover occurs, the mobile terminal and a cell perform a handover to the hybrid cell according to the above-explained process.

In this case, a base station corresponding to the hybrid cell is required to preferentially accept mobile terminals belonging to the CSG and prioritize the mobile terminals in operations such as QoS control, in cooperation with an apparatus such as MME of a core network, even if the radio resources in the hybrid cell have already been occupied (congested).

If a mobile terminal belonging to the CSG in the radio resource control idle mode enters the coverage of the hybrid cell and tries to activate the random access procedure for an initial access, the hybrid cell in the congestion state rejects the initial access from the mobile terminal regardless of congestion caused by the connection with another mobile terminal not belonging to the CSG, for example.

In other words, the mobile terminal belonging to the CSG, which should be prioritized, is prevented from performing an initial access by the other mobile terminal not belonging to the CSG.

In view of this problem, a conventional technique limits random access procedures performed by mobile terminals not belonging to the CSG (Patent Literature 1 below), for example.

Japanese Laid-open Patent Publication No. 2011-041281
Non-Patent Literature 1: 3GPP, TS36.300, V9.5.0 (2010-09), Subclause10.5.1.2
Non-Patent Literature 2: 3GPP, TS36.213, V9.3.0 (2010-09), Clause6

SUMMARY (1) A mobile communication system according to a first aspect of the invention includes: a mobile terminal; a specified mobile terminal to perform communication preferentially over the mobile terminal; and a base station accessible from both the mobile terminal and the specified mobile terminal. The specified mobile terminal transmits a first message to the base station, the first message indicating the presence of the specified mobile terminal trying to establish a connection, the first message containing information unique to the specified mobile terminal. The base station receives the first message, and transmits a first response message in response to the first message to the specified mobile terminal.

(2) A mobile communication system according to a second aspect includes: a mobile terminal; a specified mobile terminal to perform communication preferentially over the mobile terminal; and a base station accessible from both the mobile terminal and the specified mobile terminal. The specified mobile terminal transmits a first message to the base station, the first message indicating the presence of the specified mobile terminal trying to establish a connection, the first message containing information unique to the specified mobile terminal. The base station receives the first message, and transmits a first response message in response to the first message to the specified mobile terminal. The specified mobile terminal receives the first response message, and transmits a second message to the base station, the second message requesting the base station to allocate radio resources, the second message containing information unique to the specified mobile terminal. The base station receives the second message, and transmits a second response message in response to the second message to the specified mobile terminal.

(3) A mobile communication system according to a third aspect includes: a mobile terminal; a specified mobile terminal to perform communication preferentially over the mobile terminal; and a base station accessible from both the mobile terminal and the specified mobile terminal. After the specified mobile terminal transmits a first message indicating the presence of the specified mobile terminal trying to establish a connection and then receives a first response message in response to the first message, the specified mobile terminal transmits a second message to the base station, the second message requesting the base station to allocate radio resources, the second message containing information unique to the specified mobile terminal. The base station receives the second message, and transmits a second response message in response to the second message to the specified mobile terminal.

(4) A specified mobile terminal according to a fourth aspect is involved in the mobile communication system according to the first aspect. The specified mobile terminal includes: a first message generator to generate a first message indicating the presence of the mobile terminal trying to establish a connection, the first message containing information unique to the specified mobile terminal; and a first transmitter to transmit the first message generated in the first message generator to the base station.

(5) A specified mobile terminal according to a fifth aspect is involved in the mobile communication system according to the second aspect. The specified mobile terminal includes: a first message generator to generate a first message indicating the presence of the mobile terminal trying to establish a connection, the first message containing information unique to the specified mobile terminal; a first transmitter to transmit the first message generated in the first message generator to the base station; a second message generator to generate a second message after reception of the first response message from the base station, the second message requesting the base station to allocate radio resources, the second message containing information unique to the specified mobile terminal; and a second transmitter to transmit the second message generated in the second message generator to the base station.

(6) A specified mobile terminal according to a sixth aspect is involved in the mobile communication system according to the third aspect. The specified mobile terminal includes: a second message generator to generate a second message, after the mobile terminal transmits a first message indicating the presence of the mobile terminal trying to establish a connection and then receives a first response message in response to the first message, the second message requesting the base station to allocate radio resources, the second message containing information unique to the specified mobile terminal; and a second transmitter to transmit the second message generated in the second message generator to the base station.

(7) A base station according to a seventh aspect is involved in the mobile communication system according to the first aspect. The base station includes: a first receiver to receive the first message; and a first transmitter to transmit a first response message in response to the first message to the specified mobile terminal, after the first receiver receives the first message.

(8) A base station according to an eighth aspect is involved in the mobile communication system according to the second aspect. The base station includes: a first receiver to receive the first message; a first transmitter to transmit a first response message in response to the first message to the specified mobile terminal, after the first receiver receives the first message; a second receiver to receive the second message; and a second transmitter to transmit a second response message in response to the second message to the specified mobile terminal, after the second receiver receives the second message.

(9) A base station according to a ninth aspect is involved in the mobile communication system according to the third aspect. The base station includes: a second receiver to receive the second message; and a second transmitter to transmit a second response message in response to the second message to the specified mobile terminal, after the second receiver receives the second message.

(10) A storage unit according to a tenth aspect is used for the mobile terminal according to the first or second aspect. The storage unit includes a storage to store information for generation of the first message, the storage having a directory structure to retain the information for generation of the first message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates example information contained in notification information SIB1 transmitted from a base station;

FIGS. 8A to 8C illustrate example information contained in notification information SIB2 transmitted from a hybrid cell base station according to the first embodiment;

FIG. 9 illustrates an example procedure between a hybrid cell base station (hybrid cell) and a mobile terminal according to the first embodiment;

FIG. 10 illustrates the process of connecting to a core network in a mobile terminal according to the first embodiment;

FIGS. 11A to 11C illustrate example information contained in notification information SIB2 transmitted from a hybrid cell base station according to a first modification of the first embodiment;

FIG. 18 illustrates an example configuration of EF_ACSG according to the second modification of the first embodiment;

FIG. 19 illustrates an example CSG Lists TLV object according to the second modification of the first embodiment;

FIG. 20 illustrates example CSG Information according to the second modification of the first embodiment;

FIGS. 26A to 26D illustrate an example RRC Connection Request according to the second embodiment;

FIGS. 27A to 27C illustrate an example RRC Connection Setup Complete according to the second embodiment;

FIG. 32 illustrates the process of connecting to a core network in a mobile terminal according to the third embodiment.

DESCRIPTION OF EMBODIMENTS

The embodiments of the invention will now be described with reference to the accompanying drawings. The embodiments below are mere examples and do not intend to exclude application of various modifications or techniques that are not described in the embodiments and their modifications. In other words, the embodiments and their modifications may be variously modified within the gist of the invention.

(1) First Embodiment

Overview

Figure 4:
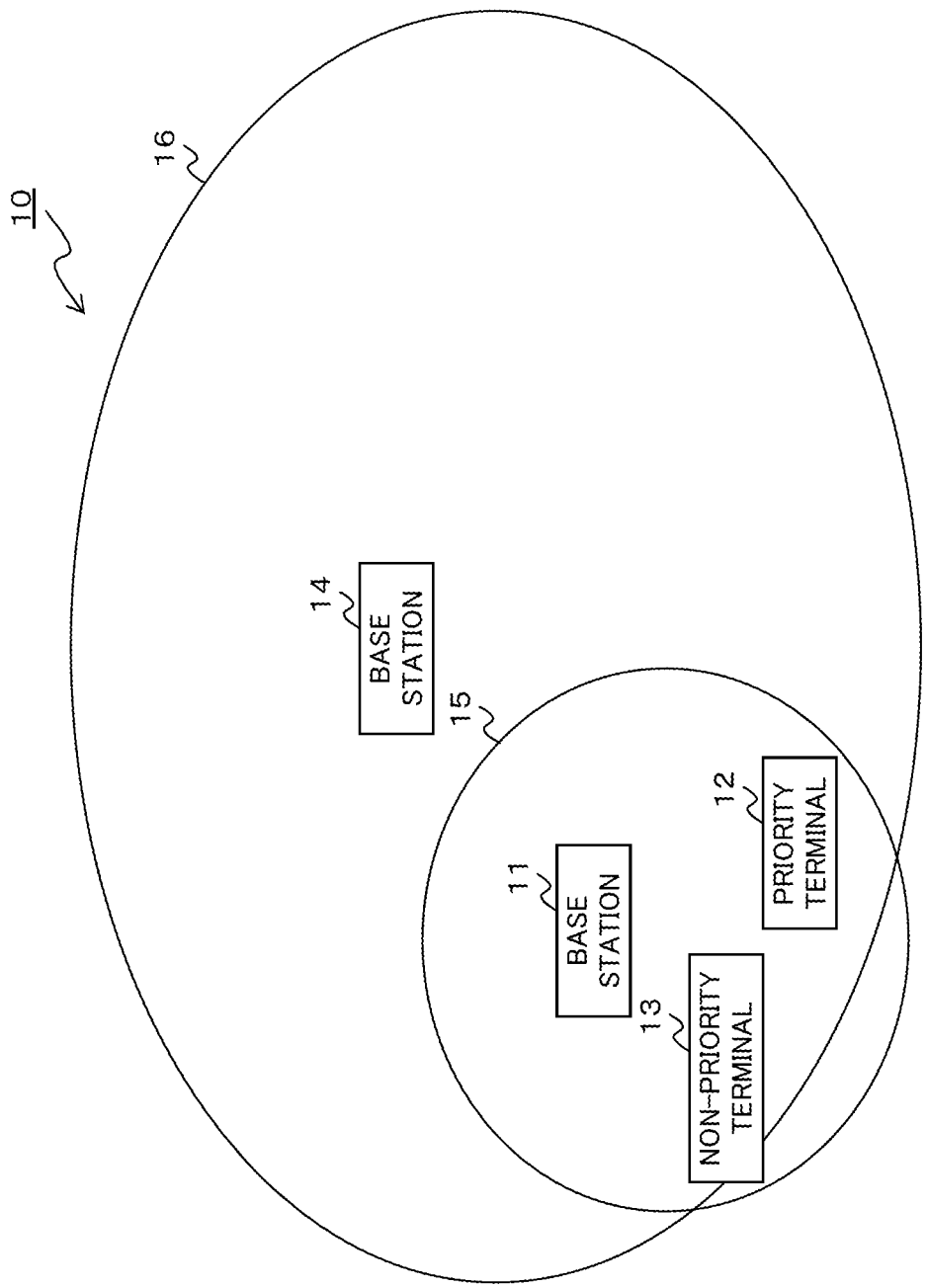
FIG. 4 illustrates an example configuration of a radio communication system according to a first embodiment.

FIG. 4 illustrates an example configuration of a radio communication system according to a first embodiment.

This embodiment is applied to an LTE radio (mobile) communication system in the following example, and may also be applied to any other radio communication system.

A radio communication system 10 in FIG. 4 includes a base station (hereinafter referred to as "hybrid cell base station" or merely "base station") 11 corresponding to a hybrid cell 15, a mobile terminal (hereinafter referred to as "priority terminal" or "specified mobile terminal") 12 belonging to the closed subscriber group (CSG) of the hybrid cell 15, a mobile terminal (hereinafter referred to as "non-priority terminal" or "mobile terminal") 13 not belonging to the CSG of the hybrid cell 15, and a base station 14 corresponding to a macrocell 16, for example. If the priority terminal 12 and the non-priority terminal 13 are not discerned from each other, they are merely referred to as mobile terminals.

According to the embodiment, the hybrid cell base station 11 in a congestion state allows the priority terminal 12 to connect to the hybrid cell 15 preferentially over the non-priority terminal 13.

The hybrid cell base station 11 according to the embodiment transmits notification information in which System Information Block Type 2 (SIB2) contains PRACH-Config-SIB-Hybrid instead of normal PRACH-ConfigSIB.

The mobile terminal receives the notification information. If the mobile terminal is the priority terminal 12 belonging to the CSG of the hybrid cell base station 11, the mobile terminal generates a special RA Preamble (corresponding to a first message transmitted from a specified mobile terminal) on the basis of the PRACH-ConfigSIB-Hybrid contained in the SIB2 in the notification information, and transmits the special RA Preamble to the hybrid cell base station 11.

That is, upon an initial access from the priority terminal 12 and the non-priority terminal 13 to the hybrid cell 15 in the RRC IDLE mode, the priority terminal 12 transmits a special RA Preamble different from an RA Preamble transmitted from the non-priority terminal 13.

The hybrid cell base station 11 receives the special RA Preamble, and determines the mobile terminal that transmitted the special RA Preamble to be the priority terminal 12 belonging to the CSG of the base station 11.

Figure 5:
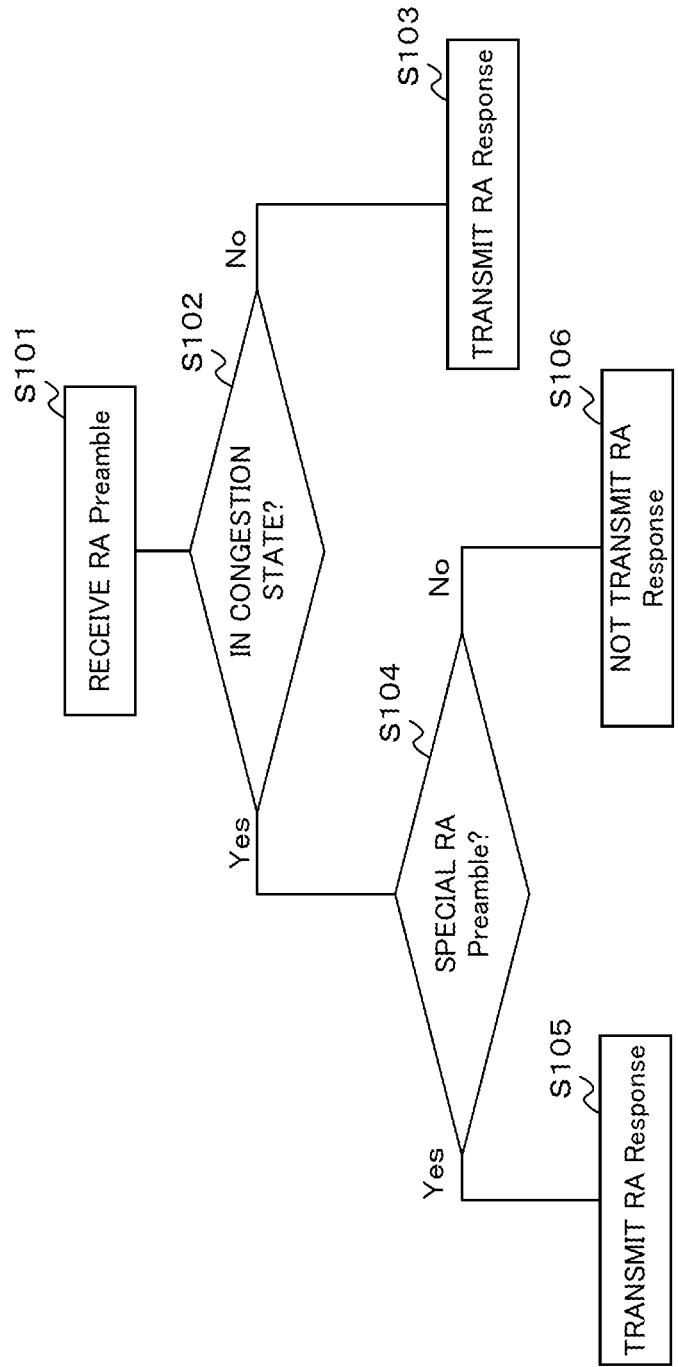
FIG. 5 is a flowchart illustrating an example operation process of a hybrid cell base station according to the first embodiment.

FIG. 5 is a flowchart illustrating an example operation process of the hybrid cell base station 11 illustrated in FIG. 4.

The hybrid cell base station 11 receives an RA Preamble from the priority terminal 12 or the non-priority terminal 13 (Step S101), and determines whether the base station 11 is in a congestion state (Step S102).

If the base station 11 is not in the congestion state (Step S102; No), it transmits an RA Response to the mobile terminal that transmitted the RA Preamble received in Step S101, regardless of whether the mobile terminal is the priority terminal 12 or the non-priority terminal 13 (Step S103).

If the base station 11 is in the congestion state (Step S102; Yes), it determines whether the RA Preamble received in Step S101 is a special RA Preamble transmitted from the priority terminal 12 (Step S104).

Figure 2:
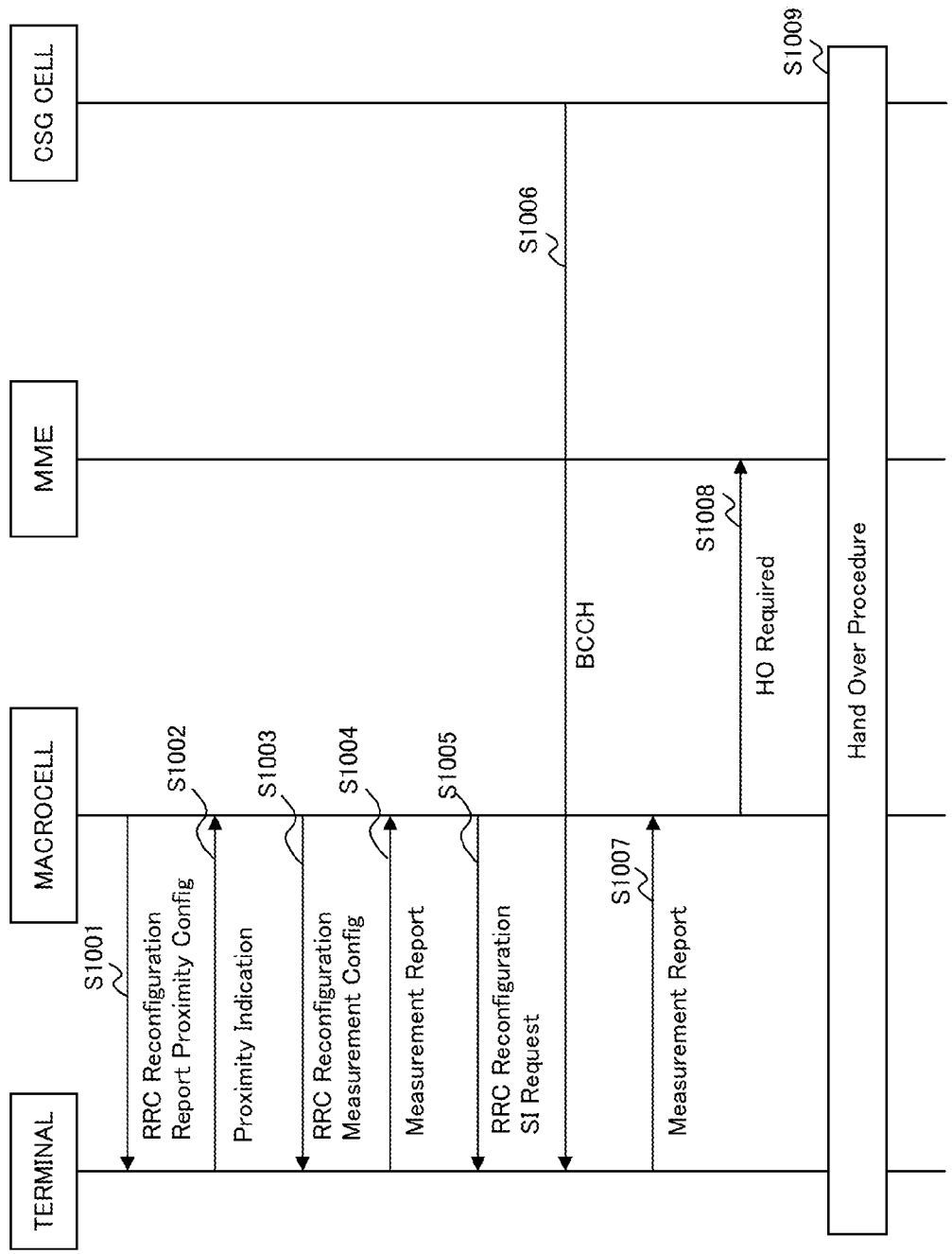
FIG. 2 illustrates the process of a handover of a mobile terminal in an RRC CONNECTED mode to a CSG cell or hybrid cell.
Figure 3:
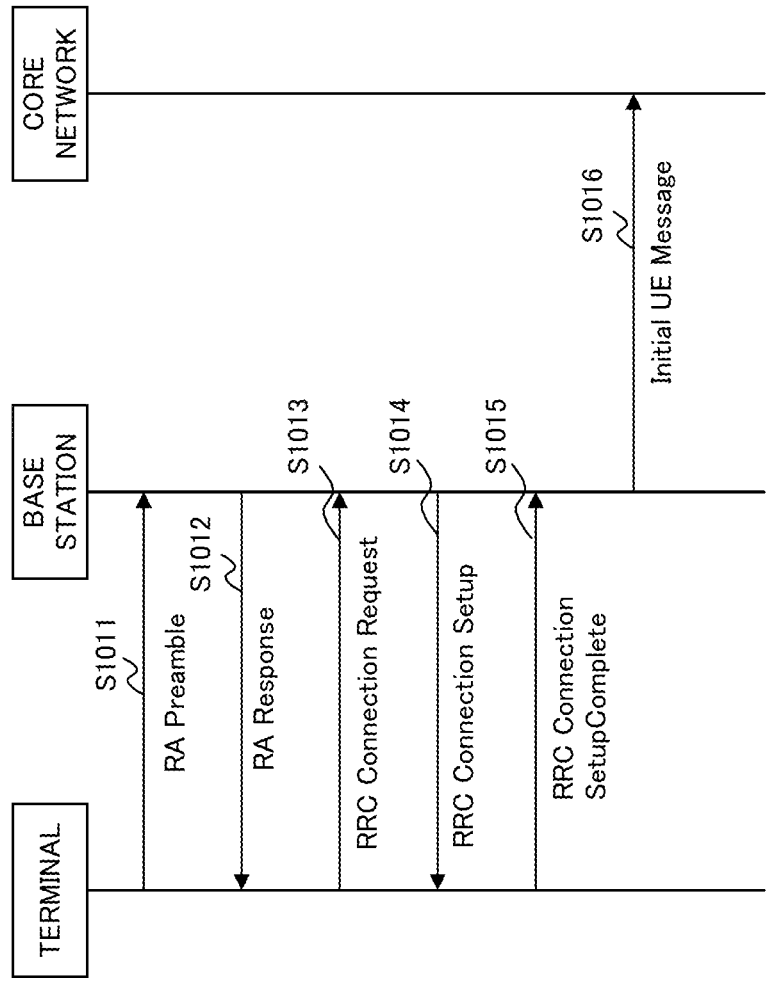
FIG. 3 illustrates the process of an initial access performed by a mobile terminal in an RRC IDLE mode.

If the base station 11 determines the received RA Preamble to be a special RA Preamble (Step S104; Yes), the base station 11 determines the mobile terminal that transmitted the special RA Preamble to be the priority terminal 12, and transmits an RA Response (corresponding to a first response message) to the mobile terminal (Step S105). This process allows the hybrid cell base station 11 and the priority terminal 12 to proceed to Step S1013 and the following steps in FIG. 3, for example, and complete the initial access.

If the base station 11 does not determine the received RA Preamble to be a special RA Preamble in Step S104 (Step S104; No), the base station 11 determines the mobile terminal that transmitted the RA Preamble to be a non-priority terminal, and does not transmit an RA Response (Step S106).

Configuration

Figure 6:
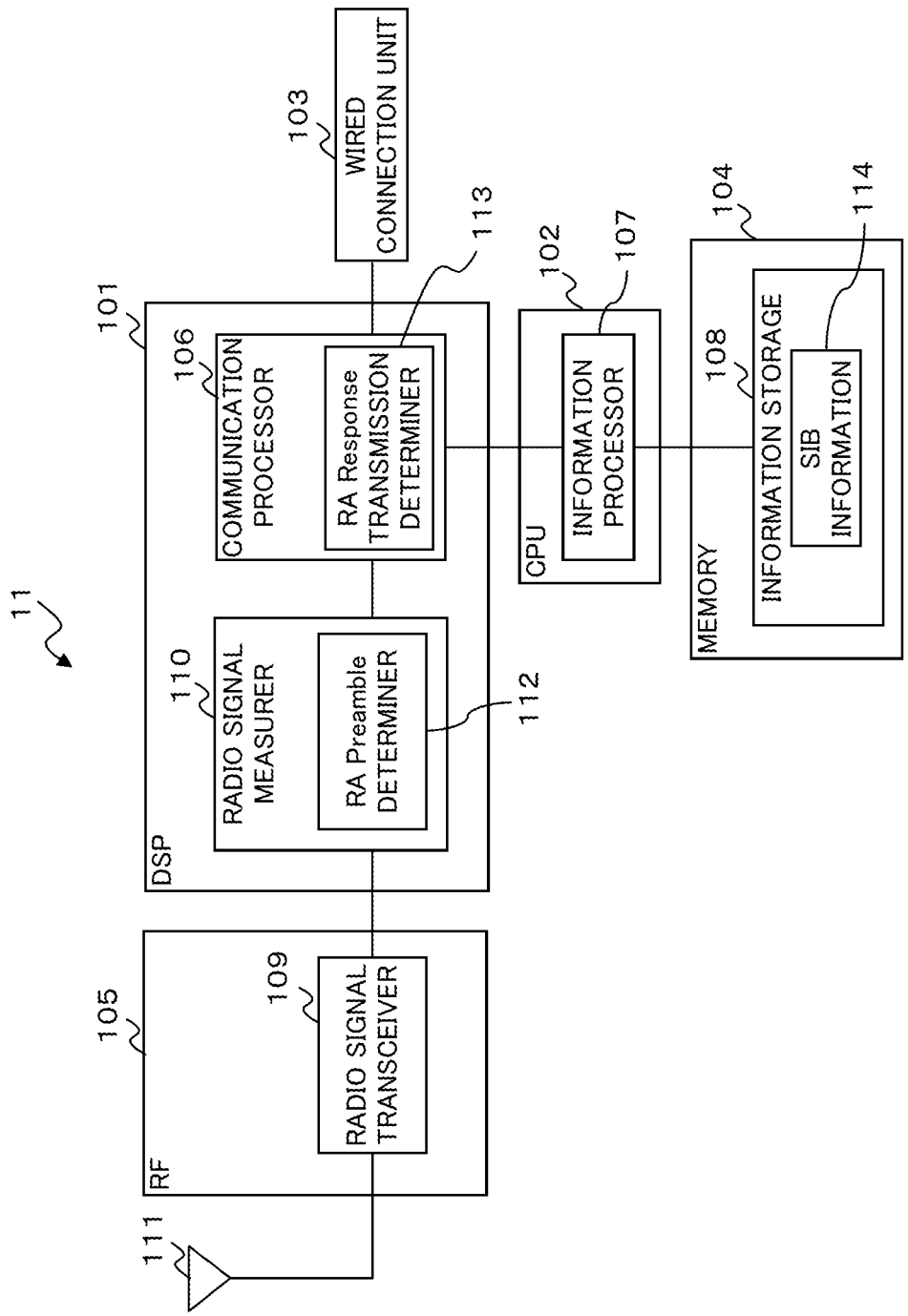
FIG. 6 is a block diagram illustrating an example functional configuration of a hybrid cell base station according to the first embodiment.

FIG. 6 is a block diagram illustrating an example functional configuration of the hybrid cell base station 11 according to the embodiment.

The hybrid cell base station 11 in FIG. 6 includes a digital signal processor (DSP) 101, a central processing unit (CPU) 102, a wired connection unit 103, a memory 104, a radio frequency (RF) unit 105, and a radio antenna 111, for example.

The DSP 101 for real-time processing includes a communication processor 106 for a predetermined communication process on wired communication and radio communication, such as scheduling for radio communication, and a radio signal measurer 110 for measurement of information contained in radio signals.

The CPU 102 for non-real-time processing executes programs, for example, stored in the memory 104 to perform various procedures. The CPU 102 includes an information processor 107 for internal processes of information.

The wired connection unit 103 to establish a connection to a wired network consists of an adapter for Ethernet (R), for example.

The memory 104 includes an information storage 108 that stores information processed in the CSG-hybrid cell base station 11 as required. The information storage 108 stores SIB information 114 (described below with reference to FIGS. 8A to 8C). The memory 104 may be any existing memory, such as RAM, ROM, non-volatile memory, or volatile memory. The memory 104 may include two or more different types of memories.

The RF unit 105 includes a radio signal transceiver 109 that transmits and receives radio signals via the radio antenna 111 (described below) for wireless communication.

The radio antenna 111 transmits and receives radio signals to and from the mobile terminals 12 and 13, other base stations, and an MME (not shown), for example.

According to the embodiment, the radio signal measurer 110 of the DSP 101 includes an RA Preamble determiner 112 (the RA Preamble determiner 112 and the radio signal transceiver 109 correspond to a receiver to receive a first message) to achieve the operations in the embodiment. The RA Preamble determiner 112 receives a special RA Preamble, which was generated by the mobile terminal 12 and indicates that the mobile terminal 12 belongs to the CSG, in addition to normal RA Preambles.

The radio signal measurer 110 of the DSP 101 includes an RA Response transmission determiner 113 (the RA Response transmission determiner 113 and the radio signal transceiver 109 correspond to a transmitter). If the RA Preamble received from the mobile terminal is a special RA Preamble, the RA Response transmission determiner 113 transmits an RA Response to the mobile terminal 12 that transmitted the RA Preamble, without congestion control.

Figure 7:
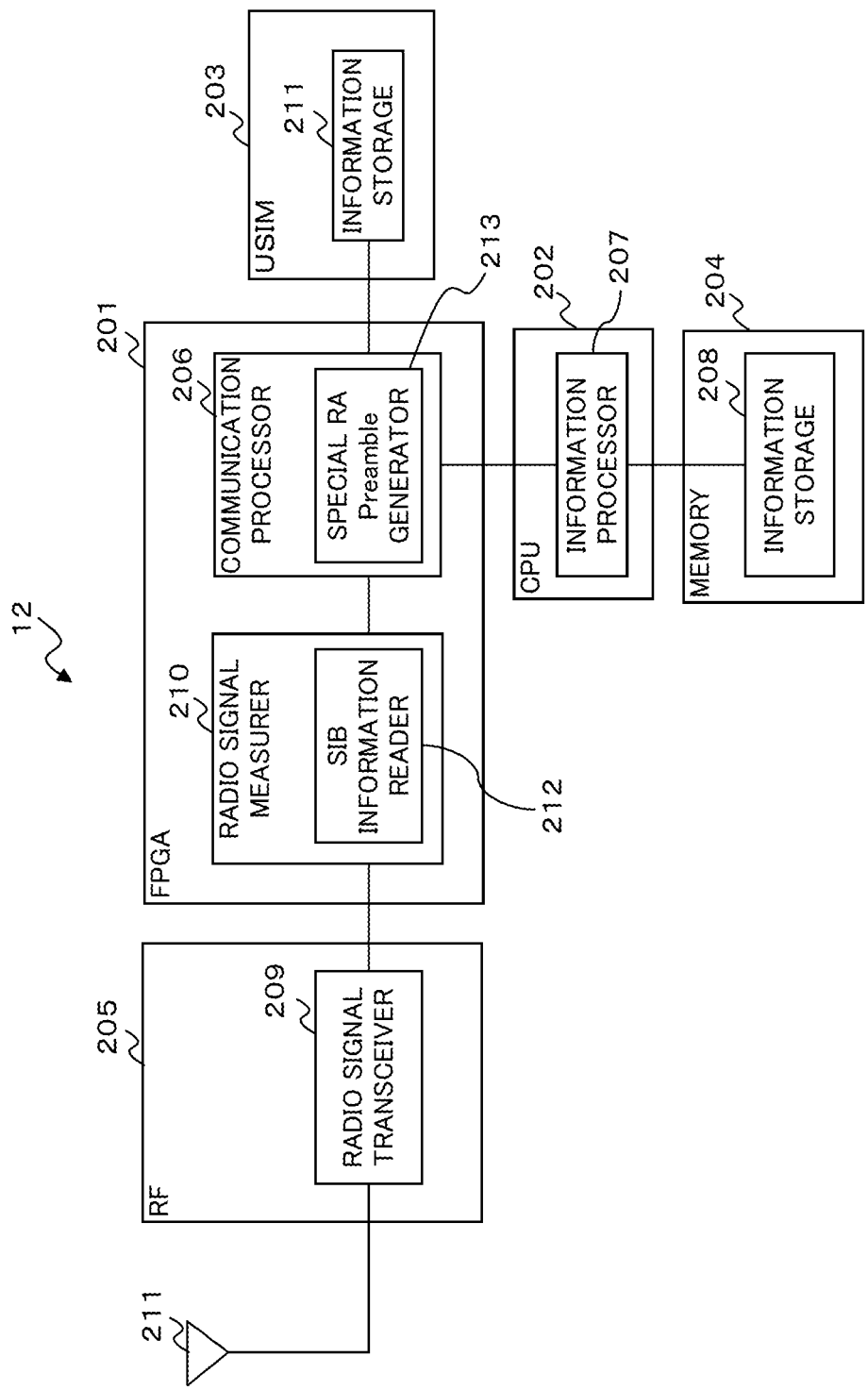
FIG. 7 is a block diagram illustrating an example functional configuration of a mobile terminal according to the first embodiment.

FIG. 7 is a block diagram illustrating an example functional configuration of the mobile terminal 12 according to the embodiment.

The mobile terminal 12 in FIG. 7 includes a field programmable gate array (FPGA) 201, a CPU 202, a universal subscriber identity module (USIM) 203, a memory 204, an RF unit 205, and a radio antenna 211, for example.

The FPGA 201 for real-time processing includes a communication processor 206 for a predetermined communication process on radio communication, such as scheduling for radio communication, and a radio signal measurer 210 for measurement of information contained in radio signals.

The CPU 202 for non-real-time processing executes programs, for example, stored in the memory 204 to perform various procedures. The CPU 202 includes an information processor 207 for internal processes of information.

The USIM 203 is an IC card for identifying a user of the mobile terminal and is removable from the mobile terminal 12. The USIM 203 includes an information storage 211 that stores data, such as a telephone number of the mobile terminal 12, information on a contractor, and information on a wireless communication carrier.

The memory 204 includes an information storage 208 that stores information processed in the mobile terminal 12 as required. The memory 204 may be any existing memory, such as RAM, ROM, non-volatile memory, or volatile memory. The memory 204 may include two or more different types of memories.

The RF unit 205 includes a radio signal transceiver 209 (corresponding to a transmitter and a receiver) that transmits and receives radio signals via the radio antenna 211 (described below) for wireless communication.

The radio antenna 211 transmits and receives radio signals to and from the base stations 11 and 14, for example.

According to the embodiment, the radio signal measurer 210 of the FPGA 201 includes an SIB information reader 212 to achieve the operations in the embodiment. The SIB information reader 212 reads PRACH-ConfigSIB-Hybrid contained in notification information SIB2 transmitted from the hybrid cell base station 11.

The communication processor 206 of the FPGA 201 includes a special RA Preamble generator 213 (corresponding to a first message generator), which generates a special RA Preamble indicating that the mobile terminal 12 belongs to the CSG, on the basis of the parameter read by the SIB information reader 212.

FIGS. 8A to 8C illustrate example information contained in notification information SIB2 retained in and transmitted from the hybrid cell base station according to the embodiment. In FIGS. 8A to 8C, the components added in the embodiment are underlined.

In specific, PRACH-ConfigSIB-Hybrid different from PRACH-ConfigSIB for normal cells is added to prach-Config in notification information from the hybrid cell 15, according to the embodiment. This information is stored as the SIB information 114 in the memory 104 of the hybrid cell base station 11.

All the mobile terminals that can receive the notification information from the hybrid cell 15 read PRACH-Config-SIB contained in the SIB2 in the notification information; and determine parameters, such as rootSequenceIndex, preamble format, system frame number, and subframe number, for generating an RA Preamble, which is the first message in a random access procedure. If the mobile terminal 12 determines the cell to be a hybrid cell having a CSG including the mobile terminal 12 on the basis of the CSGID and CSG-Indication of the SIB1 notified by the base station 11, the mobile terminal 12 generates a special RA Preamble containing PRACH-ConfigSIB-Hybrid.

Operations

FIG. 9 illustrates an example procedure between the hybrid cell base station 11 (hybrid cell 15) and the mobile terminal 12 according to the embodiment.

The radio signal transceiver 109 of the hybrid cell base station 11 transmits notification information SIB1 and SIB2 to mobile terminals located in the hybrid cell 15, via a broadcast control channel (BCCH) for notification information (Steps S21, S22, and S24).

The mobile terminal 12 determines whether it is a priority terminal in the hybrid cell on the basis of the CSGID of the notified SIB1 (Step S23).

If the mobile terminal 12 is determined to be a priority terminal in Step S23, the SIB information reader 212 of the mobile terminal 12 reads PRACH-Config-Hybrid, instead of PRACH-ConfigSIB (Step S25).

The special RA Preamble generator 213 of the mobile terminal 12 then generates a special RA Preamble indicating that the mobile terminal 12 is a priority terminal, on the basis of the PRACH-Config-Hybrid (Step S26). The radio signal transceiver 209 of the mobile terminal 12 transmits the RA Preamble to the hybrid cell base station 11 (Step S27).

The RA Preamble determiner 112 of the hybrid cell base station 11 determines the received RA Preamble to be a special RA Preamble from the priority terminal 12 (Step S28). The RA Response transmission determiner 113 of the hybrid cell base station 11 transmits an RA Response to the mobile terminal 12 without congestion control (Steps S29 and S30).

FIG. 10 illustrates the process of connecting to a core network in the mobile terminal 12 according to the first embodiment.

The SIB information reader 212 of the mobile terminal 12 generates a special RA Preamble on the basis of PRACH-ConfigSIB-Hybrid contained in SIB2 in notification information transmitted from the hybrid cell base station 11. The radio signal transceiver 209 of the mobile terminal 12 transmits the RA Preamble to the hybrid cell base station 11 (Step S71).

Upon reception of the special RA Preamble, the RA Preamble determiner 112 of the hybrid cell base station 11 determines the RA Preamble to be unique to a mobile terminal belonging to the CSG of the hybrid cell base station 11 (Step S72).

The RA Response transmission determiner 113 of the hybrid cell base station 11 transmits an RA Response to the mobile terminal 12 without congestion control (Step S73).

The mobile terminal 12 transmits an RRC Connection Request for establishing an RRC connection with the cell to the hybrid cell base station 11 (Step S74). The RRC Connection Request is a message, from a mobile terminal trying to connect to a base station, for requesting the base station to allocate the radio resources.

The hybrid cell base station 11 receives the RRC Connection Request from the mobile terminal 12, and transmits an RRC Connection Setup to the mobile terminal 12 (Step S75).

The mobile terminal 12 receives the RRC Connection Setup from the hybrid cell base station 11, and sets up an RRC connection and transmits an RRC Connection Setup to the hybrid cell base station 11 after completion of the setup (Step S76).

The hybrid cell base station 11 receives the RRC Connection Setup Complete from the mobile terminal 12, and transmits an Initial User Equipment (UE) message to a core network including a verifier, such as a home subscriber server (HSS) (Step S77). This process establishes a signaling connection between the mobile terminal 12 and the core network.

According to the embodiment, the hybrid cell base station 11 receiving an RA Preamble different from a normal RA Preamble can transmit an RA Response to the mobile terminal without congestion control, unless the radio resources are occupied by another priority terminal 12. This operation can achieve overall effective use of the radio resources of the base station 11, while preferentially allowing the priority terminal 12 belonging to the CSG to establish a connection.

[1.1] First Modification of First Embodiment

While PRACH-ConfigSIB-Hybrid different from PRACH-ConfigSIB for normal cells is added to prach-Config in notification information from the hybrid cell 15 in the above-described first embodiment, the PRACH-Config-SIB-Hybrid is not added in the first modification. In specific, a set of parameters for a hybrid cell is added to PRACH-ConfigSIB, instead of PRACH-ConfigSIB-Hybrid, as illustrated in FIG. 10.

The system configuration according to the first modification is identical to that according to the first embodiment in FIG. 4, and will not be redundantly illustrated or described.

FIGS. 11A to 11C illustrate example information contained in notification information SIB2 114' transmitted from the hybrid cell base station 11 according to the modification. In FIGS. 11A to 11C, the components added in the modification are underlined.

In specific, rootSequenceIndex-Hybrid and prach-ConfigInfo-Hybrid are added to SIB2 in the modification.

Figure 12:
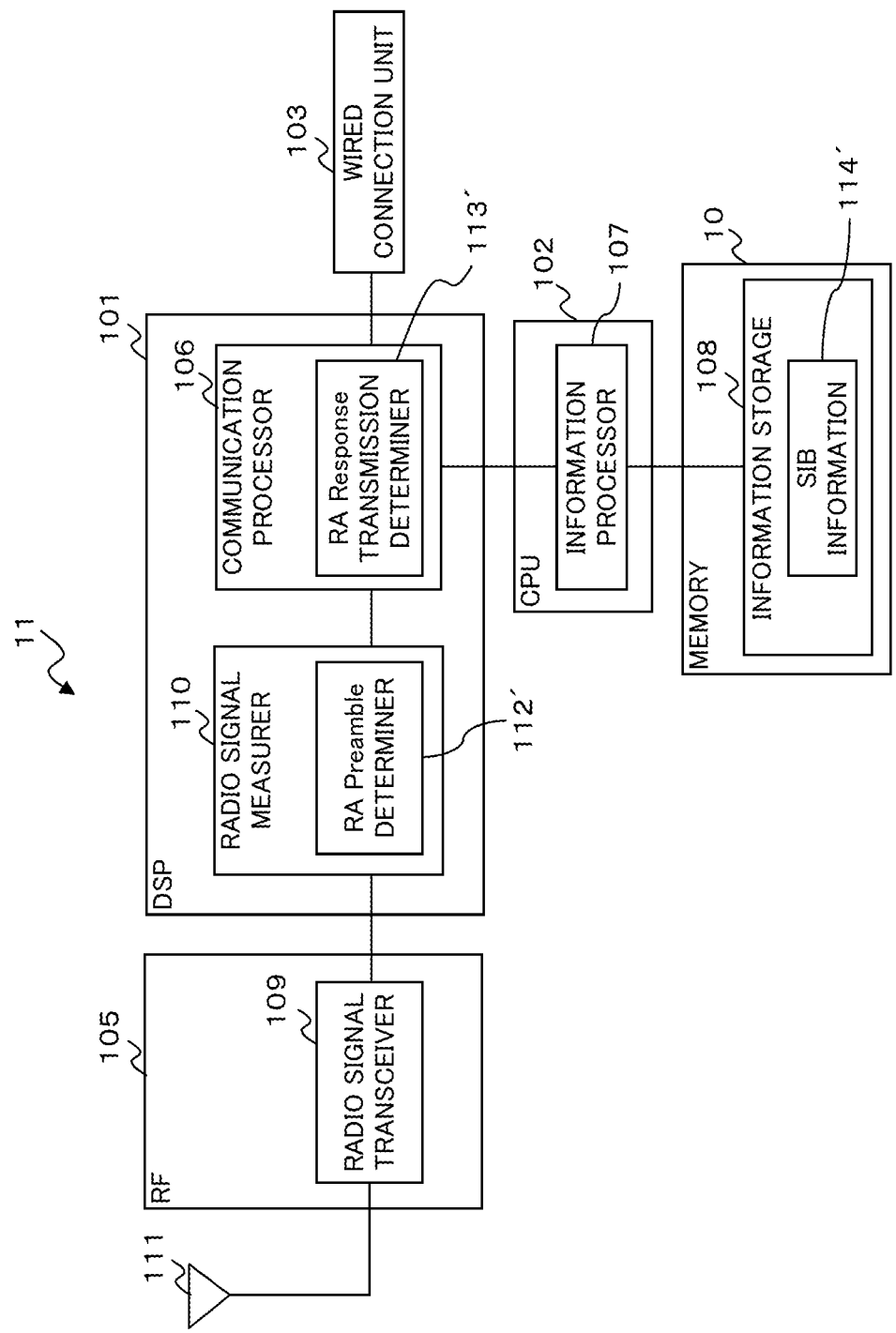
FIG. 12 is a block diagram illustrating an example functional configuration of a hybrid cell base station according to the first modification of the first embodiment.

FIG. 12 is a block diagram illustrating an example functional configuration of the hybrid cell base station 11 according to the modification.

Some of the various components in FIG. 12 that are identical to those in the first embodiment in FIG. 6 will be referred to by the same reference signs without redundant description.

According to the first modification, the information storage 108 stores SIB information 114' illustrated in FIG. 11, to achieve the operations in the modification.

The radio signal measurer 110 of the DSP 101 includes an RA Preamble determiner 112' (the RA Preamble determiner 112' and the radio signal transceiver 109 correspond to a receiver to receive a first message). The RA Preamble determiner 112' receives a special RA Preamble, which was generated by the mobile terminal 12 and indicates that the mobile terminal 12 belongs to the CSG, in addition to normal RA Preambles.

The radio signal measurer 110 of the DSP 101 includes an RA Response transmission determiner 113' (the RA Response transmission determiner 113' and the radio signal transceiver 109 correspond to a transmitter). If the RA Preamble received from a mobile terminal is a special RA Preamble, the RA Response transmission determiner 113' transmits an RA Response to the mobile terminal 12 that transmitted the RA Preamble, without congestion control.

Figure 13:
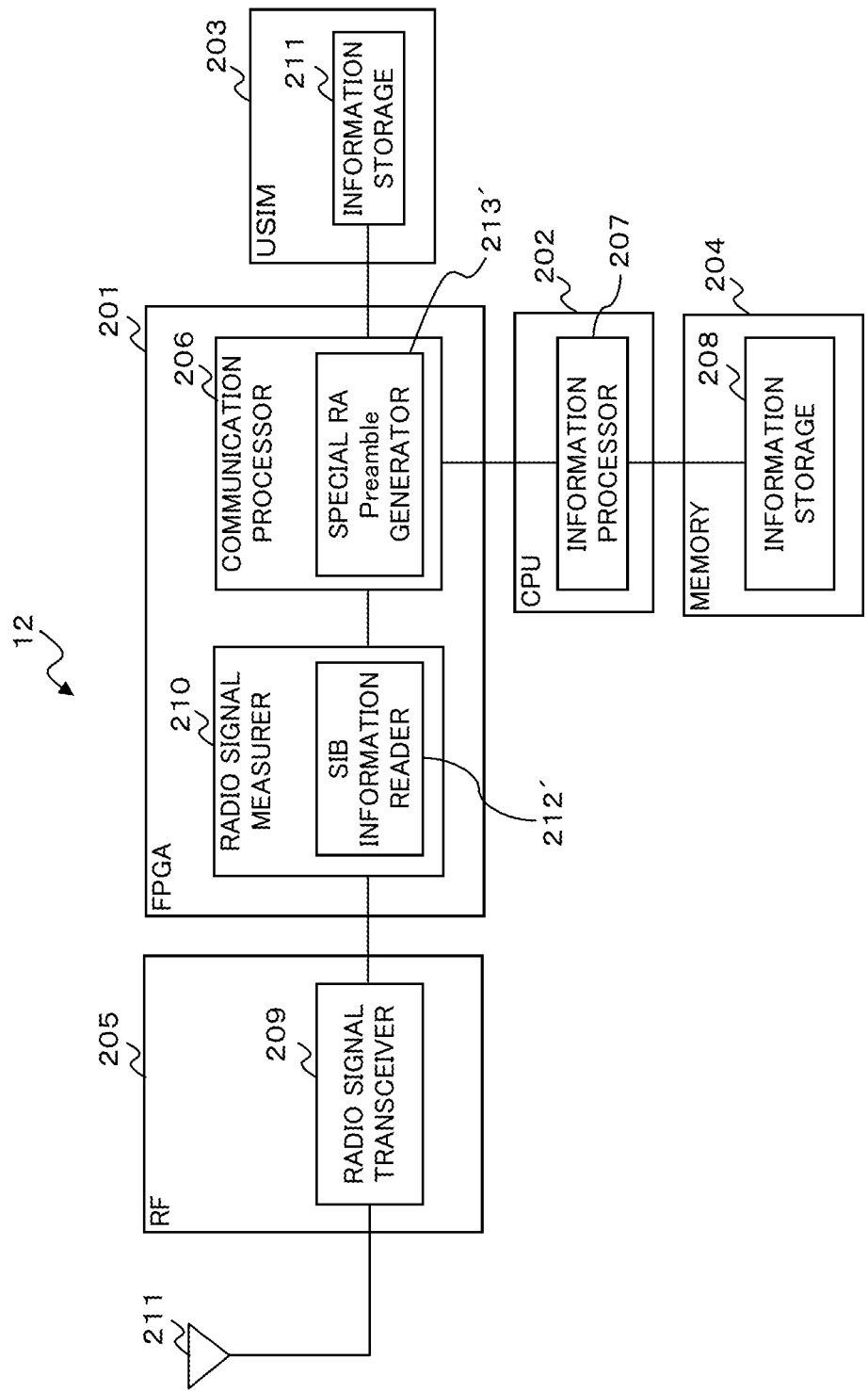
FIG. 13 is a block diagram illustrating an example functional configuration of a mobile terminal according to the first modification of the first embodiment.

FIG. 13 is a block diagram illustrating an example functional configuration of the mobile terminal 12 according to the modification.

Some of the various components in FIG. 13 that are identical to those in the first embodiment in FIG. 7 will be referred to by the same reference signs without redundant description.

According to the first modification, the radio signal measurer 210 of the FPGA 201 includes an SIB information reader 212' to achieve the operations in the modification. The SIB information reader 212' reads SIB information from notification information transmitted from the hybrid cell base station 11.

The communication processor 206 of the FPGA 201 includes a special RA Preamble generator 213' (corresponding to a first message generator), which generates a special RA Preamble indicating that the mobile terminal 12 belongs to the CSG, on the basis of the parameter read by the SIB information reader 212'.

Figure 14:
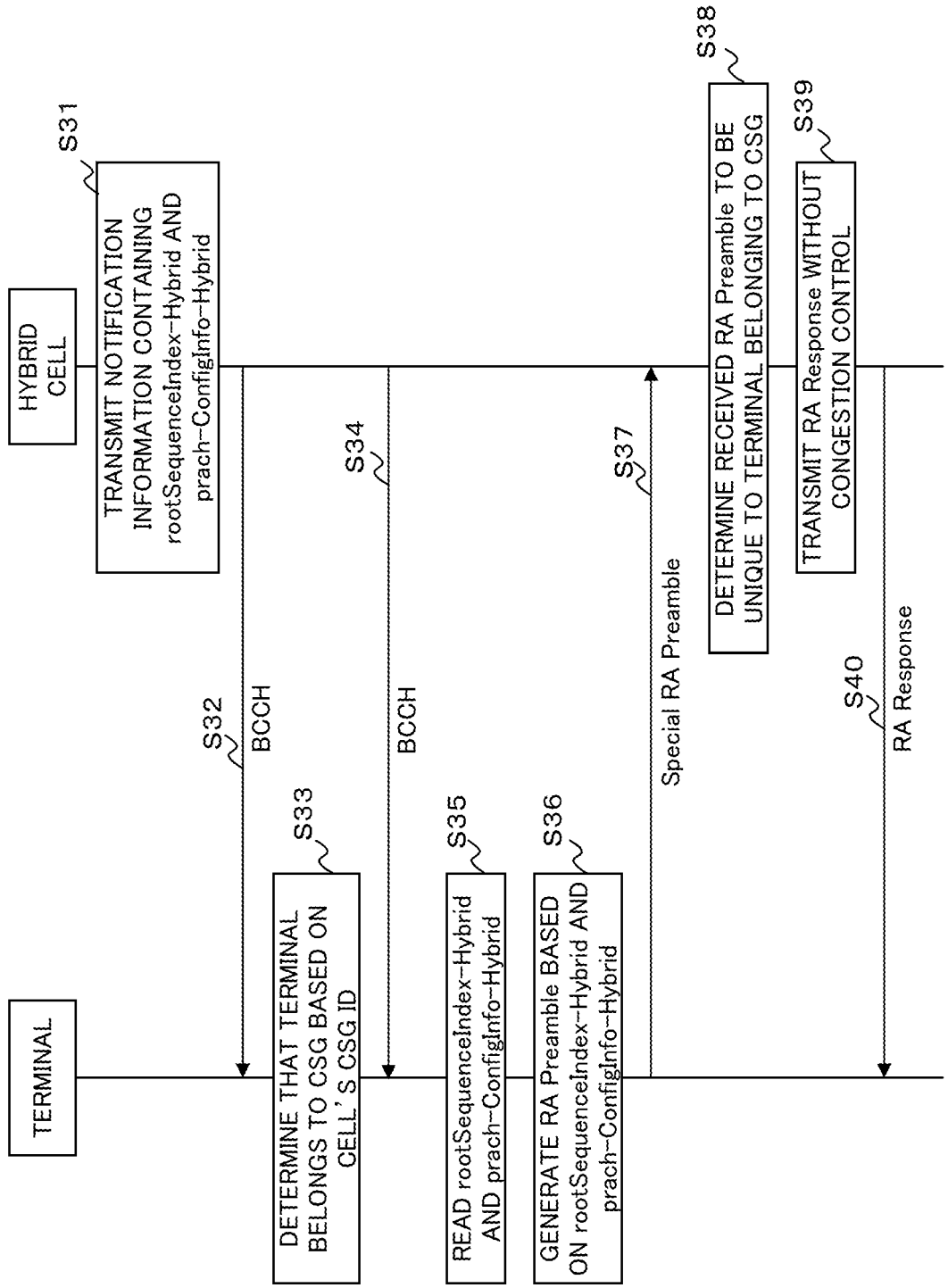
FIG. 14 illustrates an example procedure between a hybrid cell base station (hybrid cell) and a mobile terminal according to the first modification of the first embodiment.

FIG. 14 illustrates an example procedure between the hybrid cell base station 11 (hybrid cell 15) and the mobile terminal 12 according to the modification.

The radio signal transceiver 109 of the hybrid cell base station 11 transmits notification information containing rootSequenceIndex-Hybrid and prach-ConfigInfo-Hybrid to mobile terminals located in the hybrid cell 15 (Steps S31, S32, and S34).

The mobile terminal 12 determines whether it is a priority terminal in the hybrid cell 15 on the basis of the CSGID and CSG-Indication of the notified SIB1 (Step S33).

If the mobile terminal 12 is determined to be a priority terminal in Step S33, the SIB information reader 212' of the mobile terminal 12 reads the rootSequenceIndex-Hybrid and prach-ConfigInfo-Hybrid from the SIB2 (Step S35).

The special RA Preamble generator 213' of the mobile terminal 12 then generates a special RA Preamble indicating that the mobile terminal 12 is a priority terminal, on the basis of the rootSequenceIndex-Hybrid and prach-ConfigInfo-Hybrid (Step S36). The radio signal transceiver 209 of the mobile terminal 12 transmits the RA Preamble to the hybrid cell base station 11 (Step S37).

The RA Preamble determiner 112' of the hybrid cell base station 11 determines the received RA Preamble to be a special RA Preamble from the priority terminal 12 (Step S38). The RA Response transmission determiner 113' of the hybrid cell base station 11 transmits an RA Response to the mobile terminal 12 without congestion control (Steps S39 and S40).

According to the first modification of the first embodiment, the hybrid cell base station 11 receiving an RA Preamble different from a normal RA Preamble can transmit an RA Response to the mobile terminal without congestion control, unless the radio resources are occupied by another priority terminal 12. This operation can achieve overall effective use of the radio resources of the base station 11, while preferentially allowing the priority terminal 12 belonging to the CSG to connect to the CSG cell, as in the above-described first embodiment. Furthermore, the first modification, which does not involve addition of PRACH-ConfigSIB-Hybrid, requires fewer changes in SIB2 than those in the first embodiment.

[1.2] Second Modification of First Embodiment

The parameters corresponding to prach-Config are stored in the hybrid cell base station 11 according to the first embodiment and its first modification, while the parameters are retained in the USIM 203 or the memory 204 of the mobile terminal 12 according to the second modification.

Figure 15:
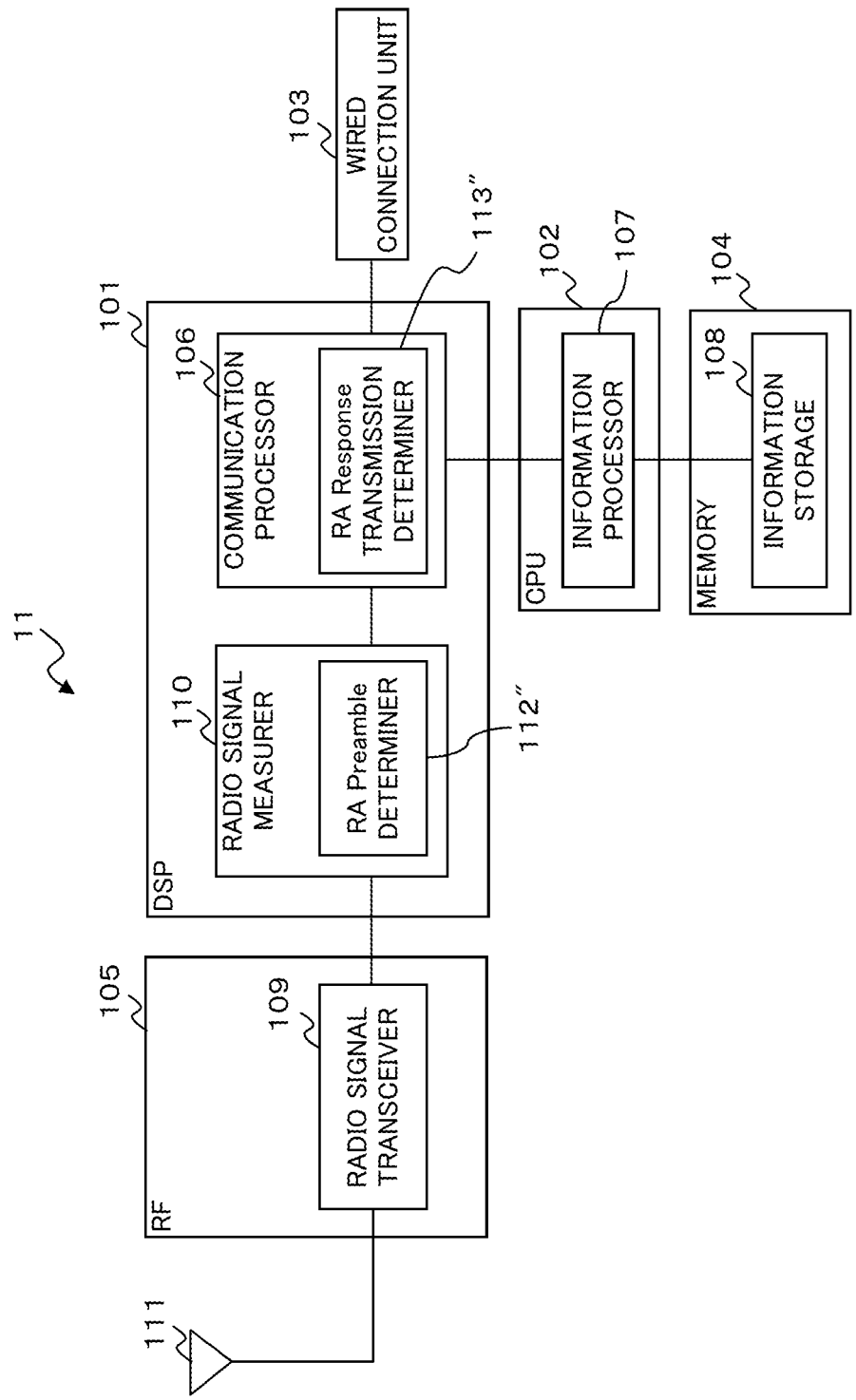
FIG. 15 is a block diagram illustrating an example functional configuration of a hybrid cell base station according to a second modification of the first embodiment.

FIG. 15 is a block diagram illustrating an example functional configuration of the hybrid cell base station 11 according to the second modification.

Some of the various components in FIG. 15 that are identical to those in the first embodiment in FIG. 6 will be referred to by the same reference signs without redundant description.

According to the second modification, the radio signal measurer 110 of the DSP 101 includes an RA Preamble determiner 112" (the RA Preamble determiner 112" and the radio signal transceiver 109 correspond to a receiver to receive a first message) to achieve the operations in the modification. The RA Preamble determiner 112" receives a special RA Preamble, which was generated by the mobile terminal 12 and indicates that the mobile terminal 12 belongs to the CSG, in addition to normal RA Preambles.

The radio signal measurer 110 of the DSP 101 includes an RA Response transmission determiner 113" (the RA Response transmission determiner 113" and the radio signal transceiver 109 correspond to a transmitter). If the RA Preamble received from a mobile terminal is a special RA Preamble, the RA Response transmission determiner 113" transmits an RA Response to the mobile terminal 12 that transmitted the RA Preamble, without congestion control.

Figure 16:
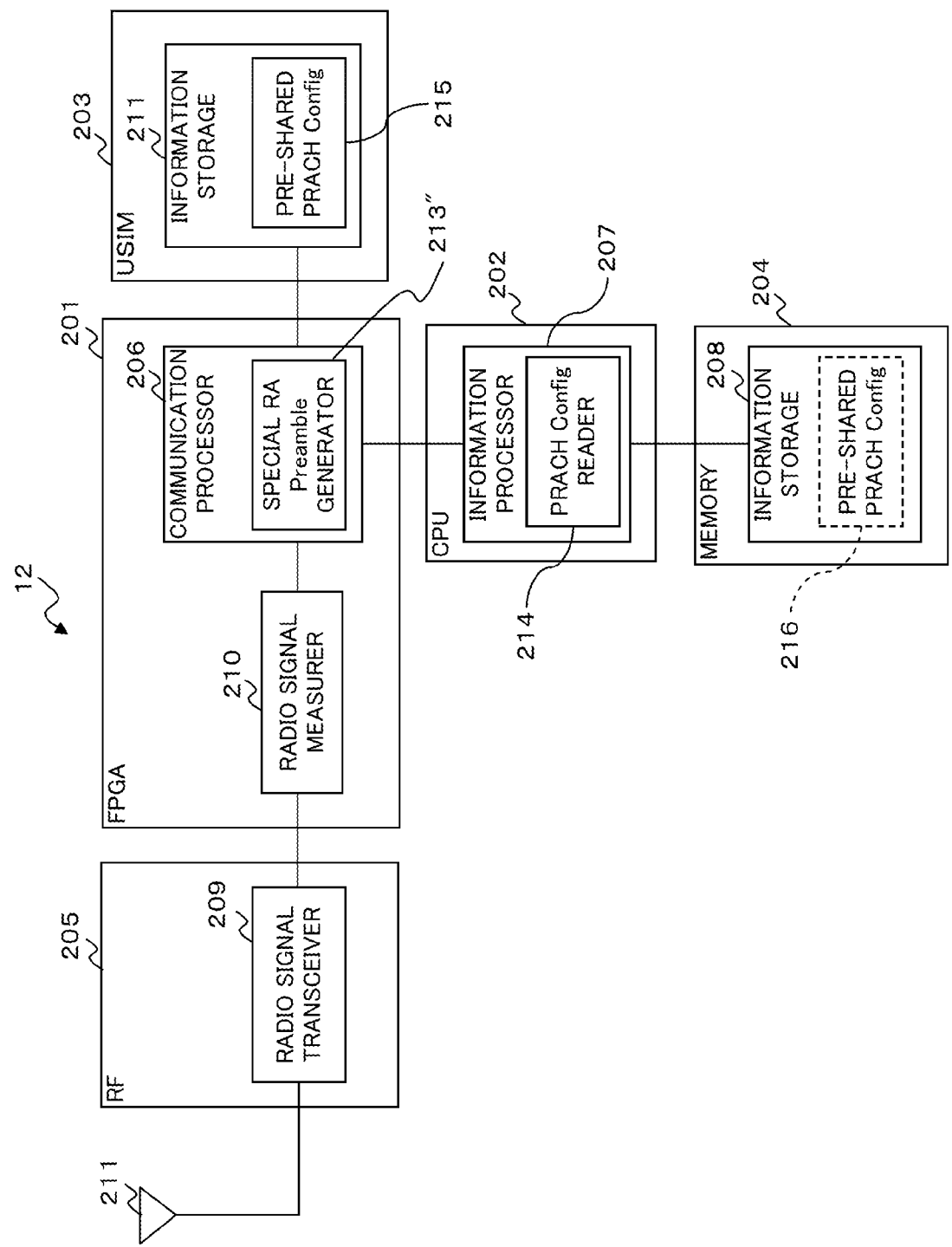
FIG. 16 is a block diagram illustrating an example functional configuration of a mobile terminal according to the second modification of the first embodiment.

FIG. 16 is a block diagram illustrating an example functional configuration of the mobile terminal 12 according to the modification.

Some of the various components in FIG. 16 that are identical to those in the first embodiment in FIG. 7 will be referred to by the same reference signs without redundant description.

According to the second modification, the information storage 211 of the USIM 203 of the mobile terminal 12, for example, stores pre-shared PRACH Config 215 to achieve the operations in the modification.

Alternatively, the information storage 211 of the memory 204 may store pre-shared PRACH Config 216, as illustrated with a dashed line in FIG. 16.

The pre-shared PRACH Config 215 or 216 is stored into the USIM 203 or the memory 204 of the mobile terminal 12 upon registration of the mobile terminal 12 in the CSG of the hybrid cell 15.

The radio signal measurer 210 of the FPGA 201 includes a pre-shared PRACH Config reader 214 that reads the pre-shared PRACH Config 215 or 216.

The communication processor 206 of the FPGA 201 includes a special RA Preamble generator 213" (corresponding to a first message generator), which generates a special RA Preamble indicating that the mobile terminal 12 belongs to the CSG, on the basis of the parameter read by the pre-shared PRACH Config reader 214.

When the mobile terminal 12 enters the coverage of the hybrid cell 15, the special RA Preamble generator 213" generates an RA Preamble on the basis of the pre-shared PRACH Config 215 or 216 pre-stored in the USIM 203 or the memory 204 of the mobile terminal 12, instead of prach-Config contained in notification information from the hybrid cell base station 11.

In the current 3GPP standard, a USIM retains DF_HNB, which is a dedicated file (DF) containing EF_ACSGL, which is an elementary file (EF) containing a CSG white list. An EF for prach-Config is added to DF_HNB, for example. Alternatively, the structure of the tag length value (TLV) of EF_ACSGL may be changed for addition of prach-Config.

Figure 17:
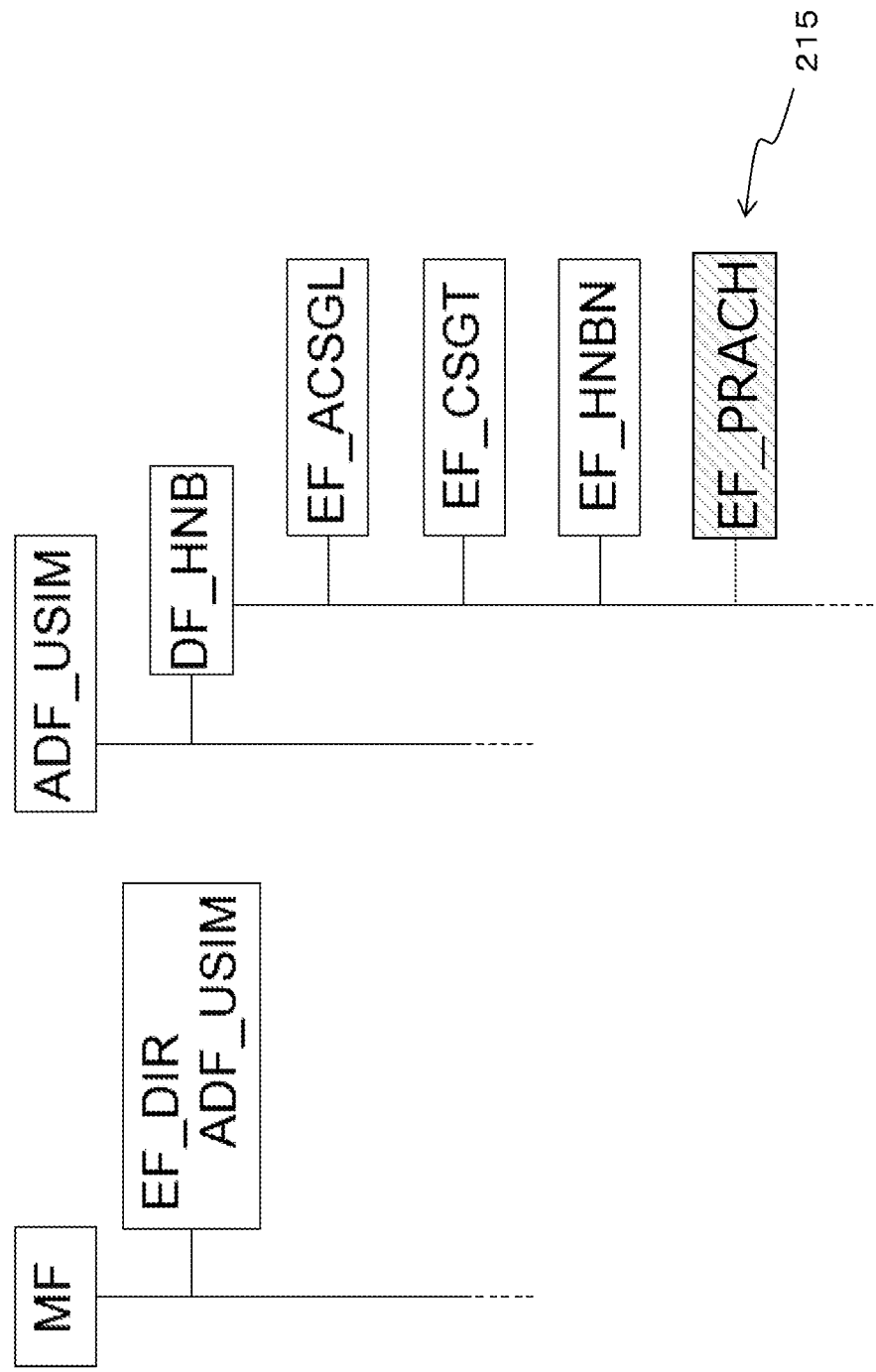
FIG. 17 illustrates an example configuration of a USIM according to the second modification of the first embodiment.

FIG. 17 illustrates an example configuration of an existing USIM containing pre-shared PRACH Config 215.

With reference to FIG. 17, EF_PRACH corresponding to prach-Config is stored in the directory structure of [AD-F_USIM/DF_HNB/EF_PRACH], for example. The parameter corresponding to prach-Config may also be stored in any other directory structure or data structure than the directory structure in FIG. 17.

FIGS. 18 to 20 illustrate the configuration of an EF in which the existing EF_ACGL of the USIM contains a TVL for prach-Config. FIG. 18 illustrates EF_ACGL, FIG. 19 illustrates CSG Lists TLV object, and FIG. 20 illustrates CSG Information.

With reference to FIG. 20, PRACH CONFIG for prach-Config may be added to the CSG Information.

Figure 21:
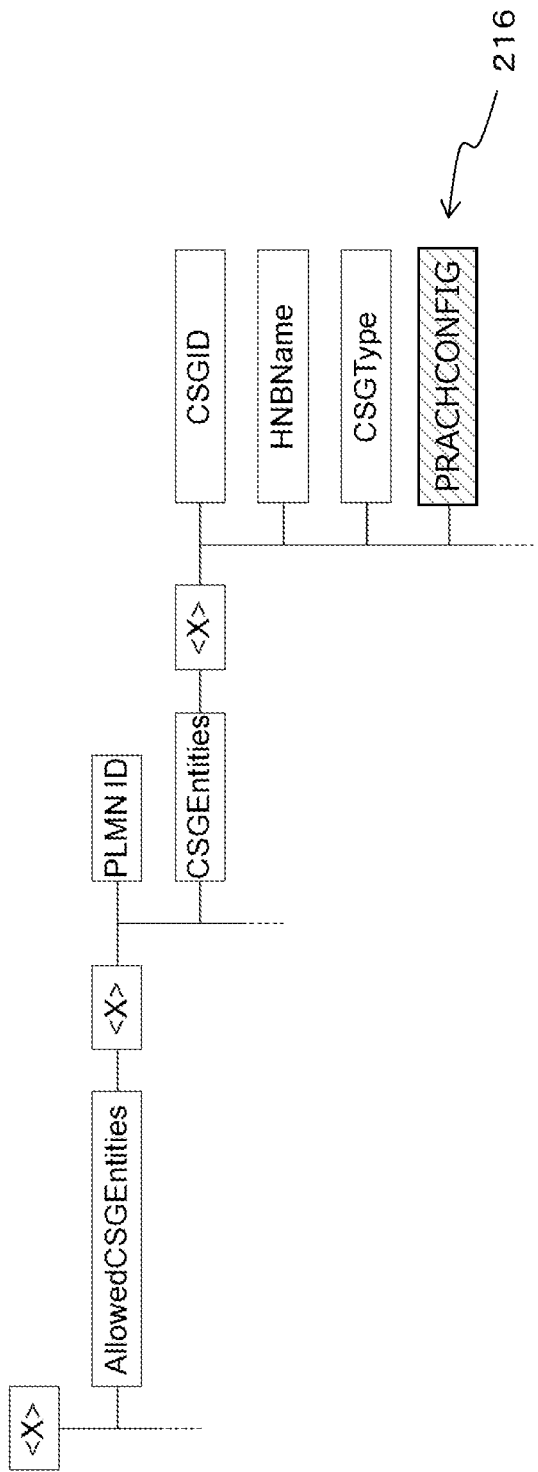
FIG. 21 illustrates an example memory configuration according to the second modification of the first embodiment.

Alternatively, prach-Config may be stored in the non-volatile memory 203 of the mobile terminal 12, for example, as illustrated with a dashed line in FIG. 16. The memory 203 of the mobile terminal 12 retains the CSG in the directory structure of [Allowed CSG Entities/CSG Entity/CSG ID, HNB Name, CSG Type]. The lowest layer of the structure, for example, may contain prach-Config. FIG. 21 illustrates a memory configuration containing prach-Config 216.

Figure 22:
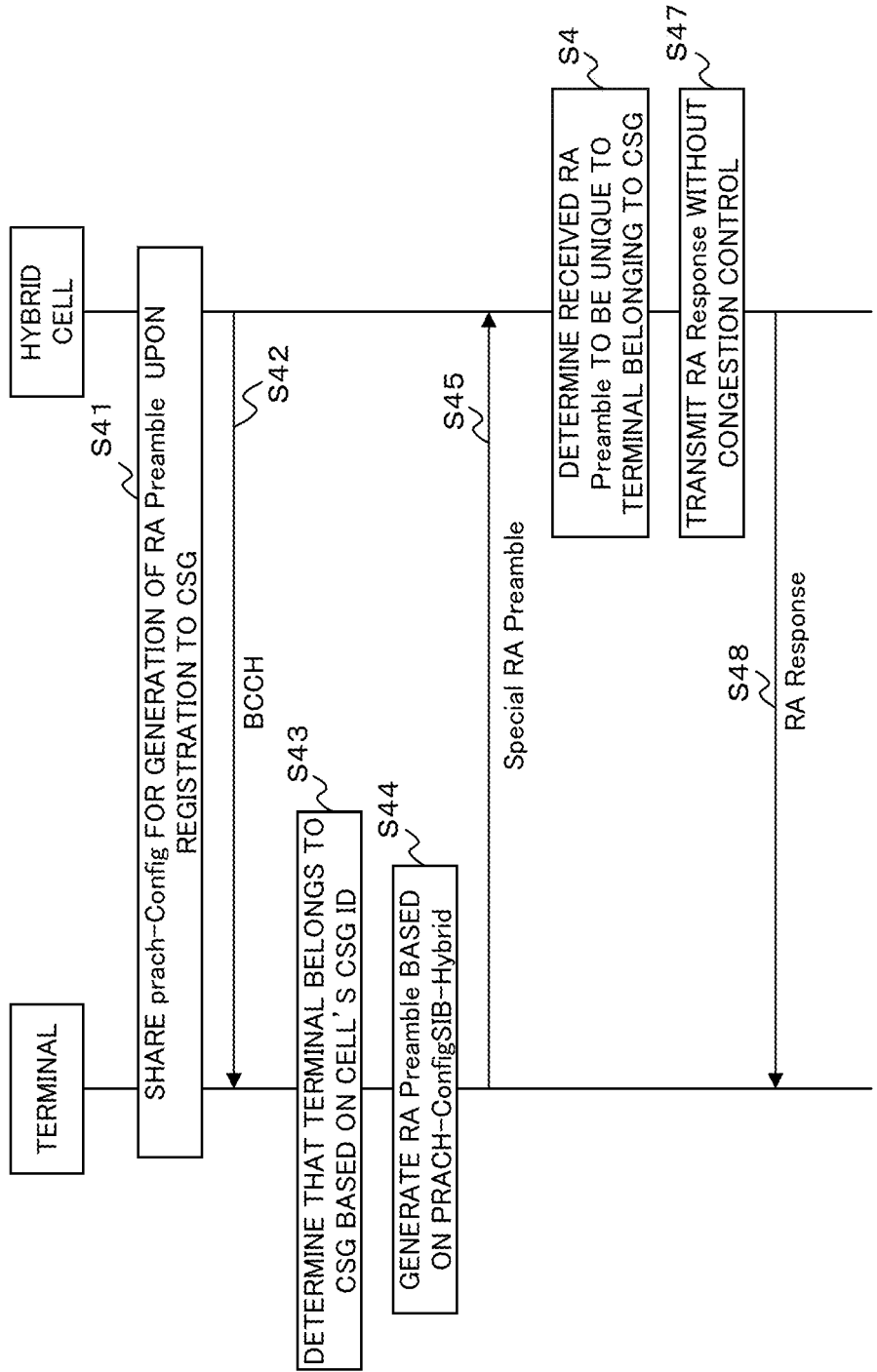
FIG. 22 illustrates an example procedure between a hybrid cell base station (hybrid cell) and a mobile terminal according to the second modification of the first embodiment.

FIG. 22 illustrates an example procedure between the hybrid cell base station 11 (hybrid cell 15) and the mobile terminal 12 according to the modification.

Prach-Config for generation of an RA Preamble is stored upon the registration in the CSG, so that the hybrid cell base station 11 and the mobile terminal can share the prach-Config in advance (Step S41).

The radio signal transceiver 109 of the hybrid cell base station 11 transmits notification information to mobile terminals located in the hybrid cell 15 (Step S42).

The mobile terminal 12 determines whether it is a priority terminal in the hybrid cell 15 on the basis of the CSGID of the notified SIB1 (Step S43).

If the mobile terminal 12 is determined to be a priority terminal in Step S43, the pre-shared PRACH Config reader 214 of the mobile terminal 12 reads the pre-shared PRACH Config 215 or 216. The special RA Preamble generator 213" of the mobile terminal 12 generates a special RA Preamble indicating that the mobile terminal 12 is a priority terminal, on the basis of the PRACH-ConfigSIB-Hybrid read by the pre-shared PRACH Config reader 214 (Step S44). The radio signal transceiver 209 of the mobile terminal 12 transmits the RA Preamble to the hybrid cell base station 11 (Step S45).

The RA Preamble determiner 112" of the hybrid cell base station 11 determines the received RA Preamble to be a special RA Preamble from the priority terminal 12 (Step S46). The RA Response transmission determiner 113" of the hybrid cell base station 11 transmits an RA Response to the mobile terminal 12 without congestion control (Steps S46 and S47).

According to the second modification of the first embodiment, the pre-shared PRACH Config may be stored in either one of the USIM 203 and the memory 204, and may be stored in both.

The second modification of the first embodiment requires changes in not the configuration of RRC parameters but only software of the base station 11 and the mobile terminal 12.

According to the second modification of the first embodiment, the hybrid cell base station 11 receiving an RA Preamble different from a normal RA Preamble can transmit an RA Response to the mobile terminal without congestion control, unless the radio resources are occupied by another priority terminal 12. This operation can achieve overall effective use of the radio resources of the base station 11, while preferentially allowing the priority terminal 12 belonging to the CSG to connect to the CSG cell, as in the above-described first embodiment and its first modification. Furthermore, the pre-shared PRACH Config stored in the mobile terminal 12 can eliminate the need to transmit the corresponding information from the hybrid cell base station 11, thereby reducing network traffic. In addition, the second modification requires changes in not the configuration of RRC parameters but only software of the base station 11 and the mobile terminal 12.

(2) Second Embodiment

Overview

In the first embodiment and its modifications, the hybrid cell base station 11 preferentially allows access from the priority terminal 12 in a congestion state, by means of a special RA Preamble transmitted from the priority terminal 12. In the second embodiment, the hybrid cell base station 11 receiving an RA Preamble from the mobile terminal 12 unconditionally transmits an RA Response, regardless of whether the mobile terminal belongs to the CSG. The determination of whether the mobile terminal 12 belongs to the CSG depends on a special value as the MME Code (MMEC) of an RRC Connection Request that the mobile terminal 12 will transmit later.

This embodiment is applied to an LTE radio (mobile) communication system in the following example, and may also be applied to any other radio communication system.

The system configuration according to the second embodiment is identical to that according to the first embodiment in FIG. 4.

A radio communication system 10 according to the second embodiment also includes a hybrid cell base station 11, a priority terminal 12 belonging to the CSG of a hybrid cell 15, a non-priority terminal 13 not belonging to the CSG of the hybrid cell 15, and a base station 14 corresponding to a macrocell 16, as illustrated in FIG. 4.

According to the embodiment, the hybrid cell base station 11 in a congestion state allows the priority terminal 12 to connect to the hybrid cell 15 preferentially over the non-priority terminal 13.

Figure 23:
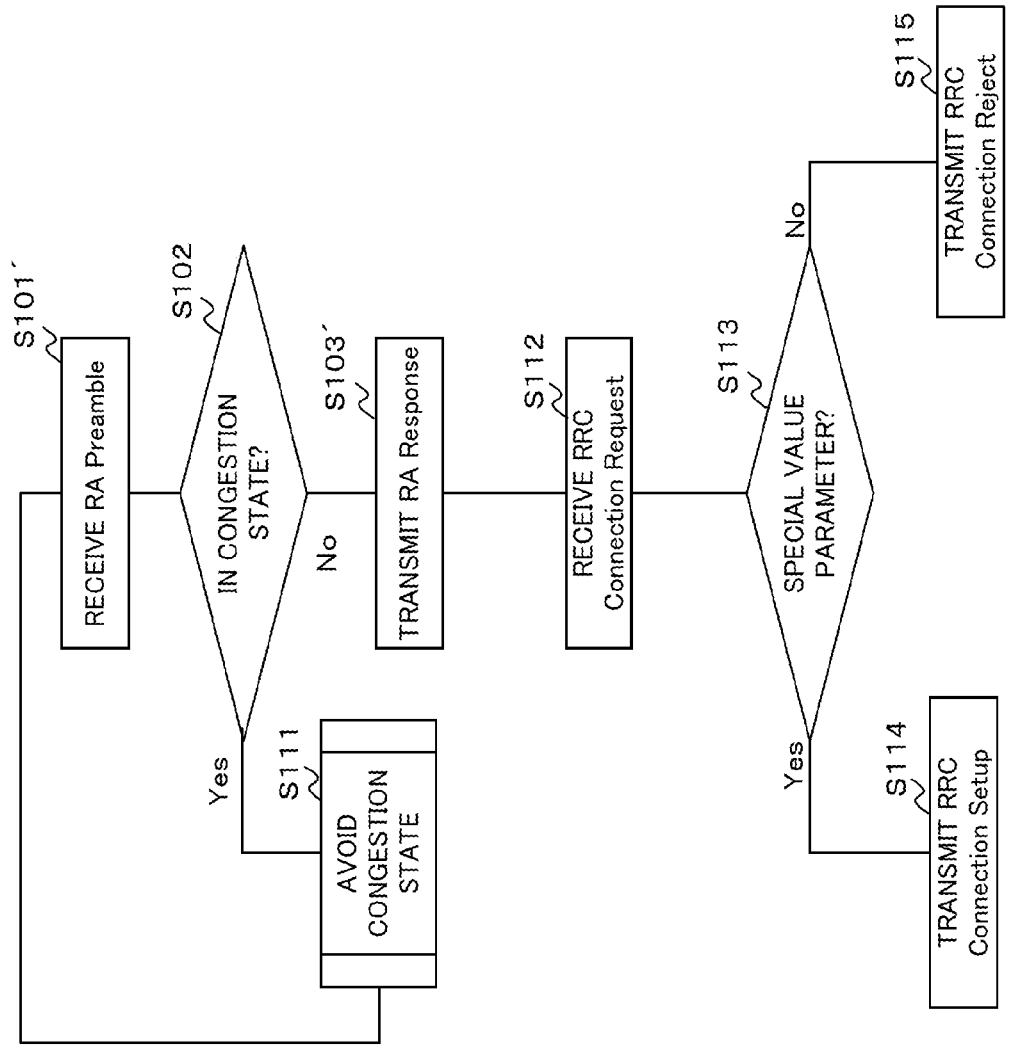
FIG. 23 is a flowchart illustrating an example operation process of a hybrid cell base station according to a second embodiment.

FIG. 23 is a flowchart illustrating an example operation process of the hybrid cell base station 11 according to the embodiment.

The hybrid cell base station 11 receives an RA Preamble from the priority terminal 12 or the non-priority terminal 13 (Step S101'), and determines whether the base station 11 is in a congestion state (Step S102).

If the hybrid cell base station 11 is in the congestion state (Step S102; Yes), it avoids the congestion state (Step S111).

If the hybrid cell base station 11 is not in the congestion state (Step S102; No), it transmits an RA Response to the mobile terminal that transmitted the RA Preamble received in Step S101, regardless of whether the mobile terminal is the priority terminal 12 (Step S103').

The hybrid cell base station 11 then receives an RRC Connection Request from the mobile terminal 12 (Step S112).

The hybrid cell base station 11 determines whether a parameter in the RRC Connection Request is a special value (corresponding to unique information) indicating that the mobile terminal 12 belongs to the CSG of the base station 11 (Step S113).

If the parameter in the RRC Connection Request is the special value (Step S113; Yes), the hybrid cell base station 11 transmits an RRC Connection Setup (Step S114).

If the parameter in the RRC Connection Request is not the special value (Step S113; No), the hybrid cell base station 11 transmits an RRC Connection Reject (Step S115).

The parameter for determination on the RRC Connection Request in Step S113 is an MME Code (MMEC), which is an identifier uniquely indicating an MME in the MME pool. The MMEC is transmitted to the base station as apart of S-TMSI in the RRC Connection Request. Such transmission is not necessarily required, and the base station may use an MMEC contained in an RRC Connection Setup Complete that the base station will receive later.

Configuration

Figure 24:
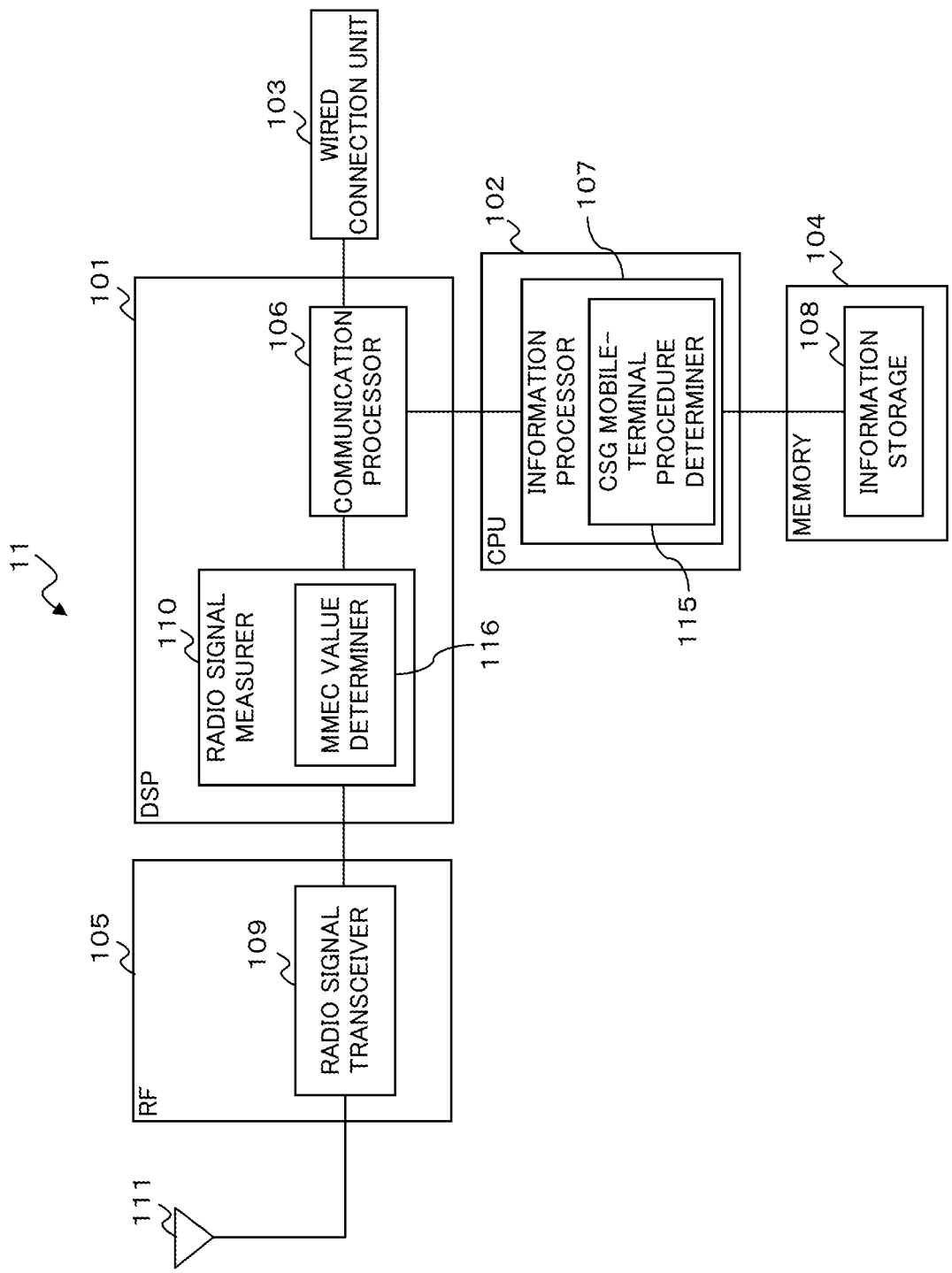
FIG. 24 is a block diagram illustrating an example functional configuration of a hybrid cell base station according to the second embodiment.

FIG. 24 is a block diagram illustrating an example functional configuration of the hybrid cell base station according to the second embodiment.

The hybrid cell base station 11 in FIG. 24 includes a DSP 101, a CPU 102, a wired connection unit 103, a memory 104, an RF unit 105, and a radio antenna 111, for example.

The DSP 101 for real-time processing includes a communication processor 106 for a predetermined communication process on wired communication and radio communication, such as scheduling for radio communication, and a radio signal measurer 110 for measurement of information contained in radio signals.

The CPU 102 for non-real-time processing executes programs, for example, stored in the memory 104 to perform various procedures. The CPU 102 includes an information processor 107 for internal processes of information.

The wired connection unit 103 to establish a connection to a wired network consists of an adapter for Ethernet (R), for example.

The memory 104 includes an information storage 108 that stores information processed in the CSG-hybrid cell base station 11 as required. The memory 104 may be any existing memory, such as RAM, ROM, non-volatile memory, or volatile memory. The memory 104 may include two or more different types of memories.

The RF unit 105 includes a radio signal transceiver 109 that transmits and receives radio signals via the radio antenna 111 (described below) for wireless communication.

The radio antenna 111 transmits and receives radio signals to and from the mobile terminals 12 and 13, other base stations, and an MME (not shown), for example.

According to the embodiment, the radio signal measurer 110 of the DSP 110 includes an MMEC value determiner 116 (the MMEC value determiner 116 and the radio signal transceiver 109 correspond to a receiver to receive a second message) to achieve the operations in the embodiment. The MMEC value determiner 116 accepts an RRC Connection Request transmitted from a mobile terminal, if the MMEC of the RRC Connection Request is a predetermined special value (e.g., "FF").

The information processor 107 of the CPU 102 includes a CSG mobile-terminal procedure determiner 107. If the MMEC of the RRC Connection Request received from the mobile terminal is the predetermined special value (e.g., "FF"), the CSG mobile-terminal procedure determiner 107 determines the mobile terminal to be a CSG mobile terminal, and continues the RRC connection procedure.

Figure 25:
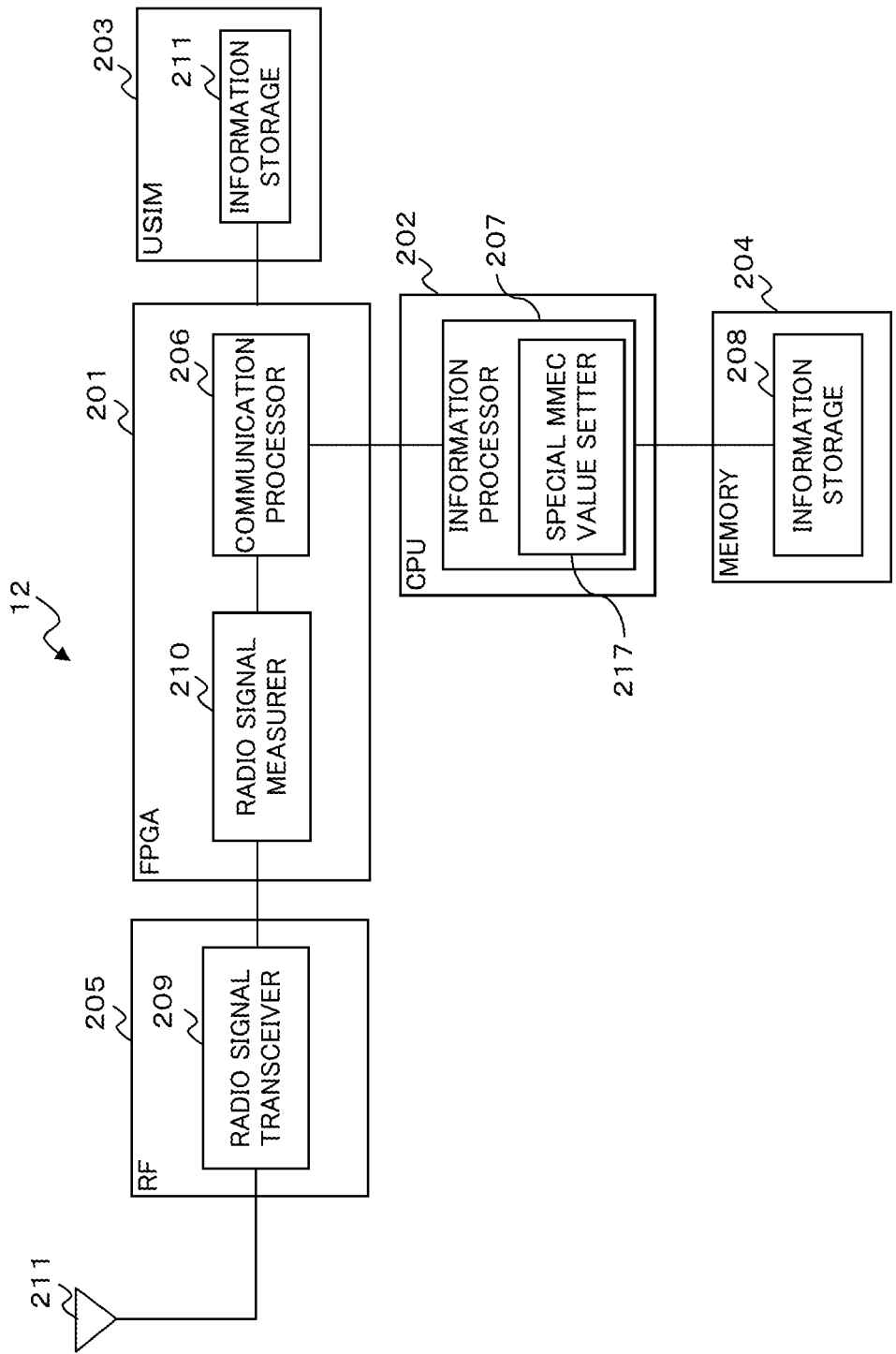
FIG. 25 is a block diagram illustrating an example functional configuration of a mobile terminal according to the second embodiment.

FIG. 25 is a block diagram illustrating an example functional configuration of the mobile terminal 12 according to the embodiment.

The mobile terminal 12 in FIG. 25 includes an FPGA 201, a CPU 202, a USIM 203, a memory 204, an RF unit 205, and a radio antenna 211, for example.

The FPGA 201 for real-time processing includes a communication processor 206 for a predetermined communication process on radio communication, such as scheduling for radio communication, and a radio signal measurer 210 for measurement of information contained in radio signals.

The CPU 202 for non-real-time processing executes programs, for example, stored in the memory 204 to perform various procedures. The CPU 202 includes an information processor 207 for internal processes of information.

The USIM 203 is an IC card for identifying a user of the mobile terminal and is removable from the mobile terminal 12. The USIM 203 includes an information storage 211 that stores data, such as a telephone number of the mobile terminal 12, information on a contractor, and information on a wireless communication carrier.

The memory 204 includes an information storage 208 that stores information processed in the mobile terminal 12 as required. The memory 204 may be any existing memory, such as RAM, ROM, non-volatile memory, or volatile memory. The memory 204 may include two or more different types of memories.

The RF unit 205 includes a radio signal transceiver 209 (corresponding to a transmitter and a receiver) that transmits and receives radio signals via the radio antenna 211 (described below) for wireless communication.

The radio antenna 211 transmits and receives radio signals to and from the base stations 11 and 14, for example.

According to the embodiment, the information processor 207 of the CPU 207 includes a special MMEC value setter 217 (corresponding to a second message generator) to achieve the operations in the embodiment. The special MMEC value setter 217 sets the MMEC of an RRC Connection Request to be, for example, a value "FF", instead of an actual MMEC value.

FIGS. 26A to 26D illustrate an example RRC Connection Request according to the embodiment.

In FIGS. 26A to 26D, the special MMEC value setter 217 of the mobile terminal 12 sets the MMEC parameter (underlined) to be, for example, the value "FF."

FIGS. 27A to 27C illustrate an example RRC Connection Setup Complete according to the embodiment.

The mobile terminal 12 notifies the hybrid cell base station 11 of the MMEC by means of an RRC Connection Setup Complete. The RRC Connection Setup Complete containing an actual MMEC value as the MMEC parameter (underlined in FIGS. 27A to 27C) is transmitted to the hybrid cell base station 11.

The hybrid cell base station 11 uses S-TMSI in which the MMEC is replaced by the MMEC of the RRC Connection Setup Complete, instead of the S-TMSI originally contained in the RRC Connection Request, to generate an Initial UE message to the MME.

Operations

The procedure between the hybrid cell base station 11 and the mobile terminal 12 will now be explained with reference to FIG. 28.

Figure 28:
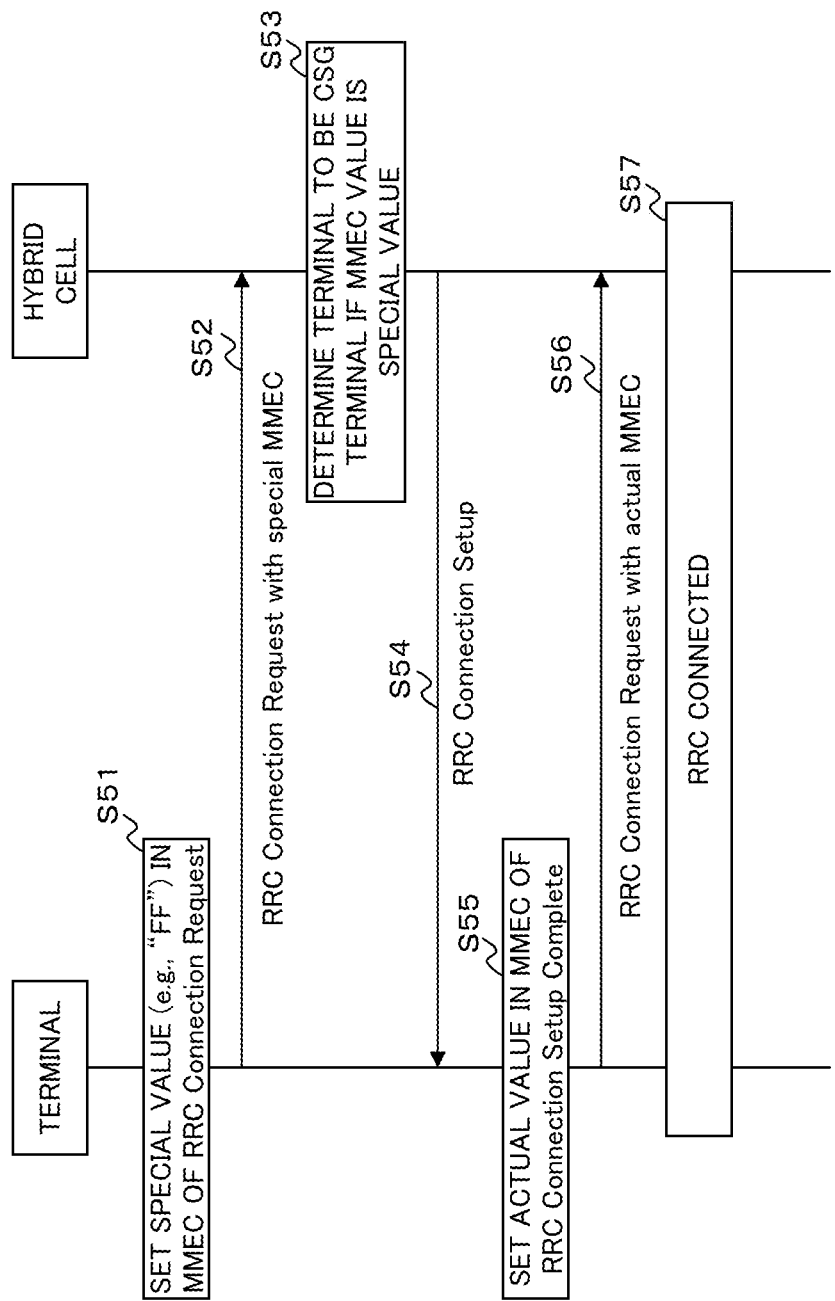
FIG. 28 illustrates an example procedure between a hybrid cell base station (hybrid cell) and a mobile terminal according to the second embodiment.

FIG. 28 illustrates an example procedure between the hybrid cell base station 11 (hybrid cell 15) and the mobile terminal 12 according to the embodiment.

The mobile terminal 12 receives an RA Response, and the special MMEC value setter 217 of the mobile terminal 12 generates an RRC Connection Request containing the MMEC of not an actual value but a special value (e.g., "FF") (Step S51). The mobile terminal 12 then transmits the RRC Connection Request to the base station (Step S52).

If the MMEC of the RRC Connection Setup is a special value, the MMEC value determiner 116 of the hybrid cell base station 11 determines that the mobile terminal 12 belongs to the CSG (Step S53). The hybrid cell base station 11 then transmits an RRC Connection Setup to the mobile terminal 12 (Step S54). If the MMEC of the RRC Connection Setup is not a special value, the hybrid cell base station 11 transmits an RRC Connection Reject to the mobile terminal (this step is not shown).

The CSG mobile-terminal procedure determiner 107 of the mobile terminal 12 generates an RRC Connection Setup Complete containing the MMEC of an actual value (Step S55). The mobile terminal 12 transmits the RRC Connection Setup Complete to the hybrid cell base station 11, to establish a radio resource control connection (Step S56).

The hybrid cell base station 11 connects to the mobile terminal 12 (Step S57), and prioritizes the mobile terminal 12 belonging to the CSG in operations, such as allocation of the resources and QoS control.

Figure 29:
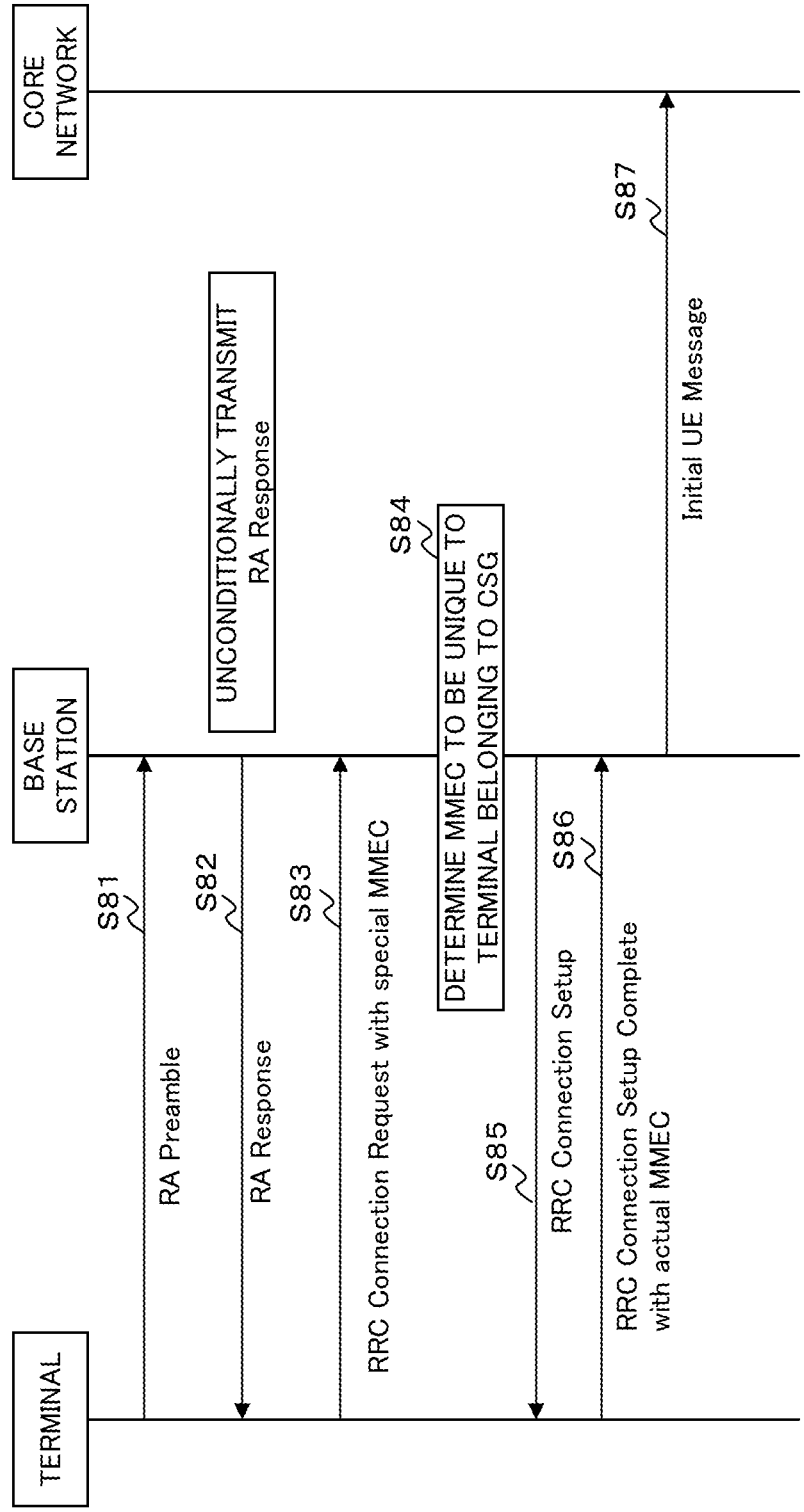
FIG. 29 illustrates the process of connecting to a core network in a mobile terminal according to the second embodiment.

FIG. 29 illustrates the process of connecting to a core network in the mobile terminal 12 according to the second embodiment.

The mobile terminal 12 generates an RA Preamble on the basis of PRACH-ConfigSIB contained in SIB2 in notification information transmitted from the hybrid cell base station 11, and transmits the RA Preamble to the hybrid cell base station 11 (Step S81).

The hybrid cell base station 11 transmits an RA Response to the mobile terminal 12 (Step S82). The hybrid cell base station 11 transmits the RA Response without any condition.

The special MMEC value setter 217 of the mobile terminal 12 generates an RRC Connection Request containing the MMEC of a predetermined special value (e.g., "FF"). The radio signal transceiver 209 of the mobile terminal 12 transmits the RRC Connection Request to the hybrid cell base station 11 (Step S83). The RRC Connection Request is a message, from a mobile terminal trying to connect to a base station, for requesting the base station to allocate the radio resources.

The MMEC value determiner 116 of the hybrid cell base station 11 determines a predetermined special MMEC value (e.g., "FF") unique to mobile terminals belonging to the CSG of the base station 11 (Step S84).

The CSG mobile-terminal procedure determiner 107 of the hybrid cell base station 11 transmits an RRC Connection Setup to the mobile terminal 12 (Step S85).

The mobile terminal 12 receives the RRC Connection Setup from the hybrid cell base station 11, and sets up an RRC connection and transmits an RRC Connection Setup to the hybrid cell base station 11 after completion of the setup (Step S86). The MMEC of the RRC Connection Setup Complete is an actual MMEC value.

The hybrid cell base station 11 receives the RRC Connection Setup Complete from the mobile terminal 12, and transmits an initial User Equipment (UE) message to a core network including a verifier, such as a home subscriber server (HSS) (Step S87). In this process, the hybrid cell base station 11 uses S-TMSI in which the MMEC is replaced by the MMEC of the RRC Connection Setup Complete, instead of the S-TMSI originally contained in the RRC Connection Request received from the mobile terminal 12. This process establishes a signaling connection between the mobile terminal 12 and the core network.

According to the second embodiment, the MMEC of the RRC Connection Setup may be any value other than "FF," unless it is identical to the actual MMEC value of the MME.

The MMEC of the RRC Connection Request is used to determine whether the mobile terminal belongs to the CSG. Alternatively, a part of the areas 0 to 255 of the MMEC may be used to prioritize multiple mobile terminals belonging to the CSG of a CSG cell or hybrid cell.

For example, the value "FF" as the MMEC of the RRC Connection Request corresponds to a mobile terminal having the highest priority, while the value "FE" corresponds to a mobile terminal having the second-highest priority.

According to the second embodiment, the hybrid cell base station 11 receiving the RA Preamble from the mobile terminal 12 unconditionally transmits an RA Response, regardless of whether the mobile terminal belongs to the CSG; and determines whether the mobile terminal 12 belongs to the CSG on the basis of the RRC Connection Request, transmitted from the mobile terminal 12, containing the MME Code (MMEC) of a special value. This operation can achieve overall effective use of the radio resources of the base station 11, while preferentially allowing the priority terminal 12 belonging to the CSG to connect to the CSG cell, as in the above-described first embodiment.

(3) Third Embodiment

Overview

The third embodiment consists of a combination of the first and second embodiments.

Although this is unlikely to occur, an RA Preamble transmitted from, for example, a mobile terminal (non-priority terminal) handed over from a neighboring cell, may be identical to the special RA Preamble unique to a mobile terminal 12 belonging to the CSG (priority terminal).

In this case, the determination that the mobile terminal transmitting an RA Preamble belongs to the CSG on the basis of the RA Preamble alone is problematic. In specific, even if the mobile terminal is actually not a priority terminal, the process erroneously proceeds to verification of the CSG in the core network.

To eliminate such an unnecessary process, the first and second embodiments are combined with each other, so that it is reexamined whether the mobile terminal is a priority terminal in an RRC Connection Request.

In specific, if the mobile terminal 12 belongs to the CSG of the hybrid cell 15, the mobile terminal 12 transmits an RRC Connection Request having a parameter of a special value unique to the mobile terminal 12. The hybrid cell base station 11 receives the RRC Connection Request having the parameter of the special value, and reexamines the probability. This operation can improve the accuracy of the determination on the mobile terminal belonging to the CSG.

The system configuration according to the third embodiment is identical to that according to the first embodiment in FIG. 4.

A radio communication system 10 according to the third embodiment also includes a hybrid cell base station 11, a priority terminal 12 belonging to the CSG of a hybrid cell 15, a non-priority terminal 13 not belonging to the CSG of the hybrid cell 15, and a base station 14 corresponding to a macrocell 16, as illustrated in FIG. 4.

According to the embodiment, the hybrid cell base station 11 in a congestion state allows the priority terminal 12 to connect to the hybrid cell 15 preferentially over the non-priority terminal 13.

Configuration

Figure 30:
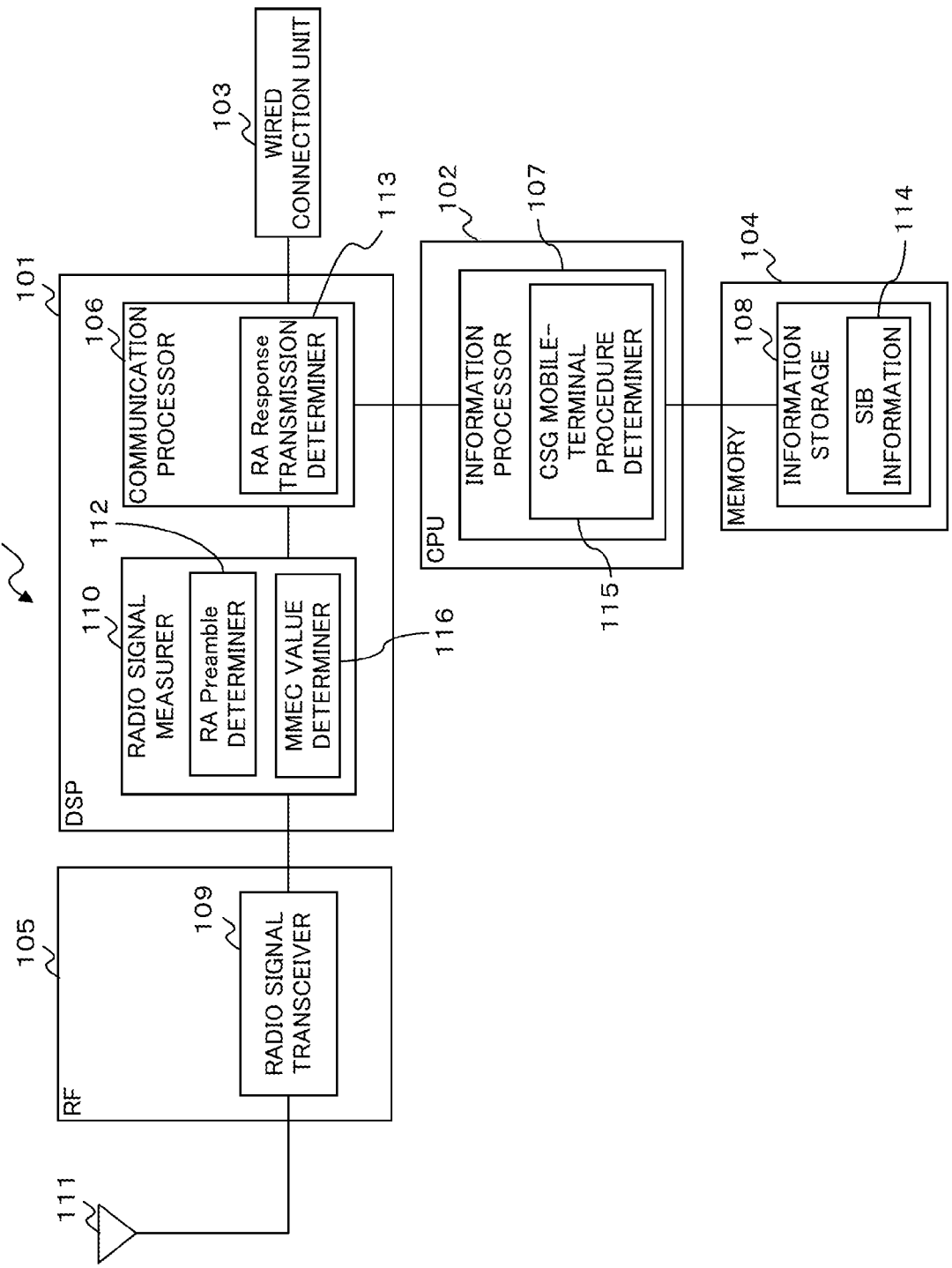
FIG. 30 is a block diagram illustrating an example functional configuration of a hybrid cell base station according to a third embodiment.

FIG. 30 is a block diagram illustrating an example functional configuration of the hybrid cell base station according to the third embodiment.

This embodiment is applied to an LTE radio (mobile) communication system in the following example, and may also be applied to any other radio communication system.

The hybrid cell base station 11 in FIG. 30 includes a DSP 101, a CPU 102, a wired connection unit 103, a memory 104, an RF unit 105, and a radio antenna 111, for example.

The DSP 101 for real-time processing includes a communication processor 106 for a predetermined communication process on wired communication and radio communication, such as scheduling for radio communication, and a radio signal measurer 110 for measurement of information contained in radio signals.

The CPU 102 for non-real-time processing executes programs, for example, stored in the memory 104 to perform various procedures. The CPU 102 includes an information processor 107 for internal processes of information.

The wired connection unit 103 to establish a connection to a wired network consists of an adapter for Ethernet (R), for example.

The memory 104 includes an information storage 108 that stores information processed in the CSG-hybrid cell base station 11 as required. The information storage 108 stores SIB information 114 (described above with reference to FIG. 8). The memory 104 may be any existing memory, such as RAM, ROM, non-volatile memory, or volatile memory. The memory 104 may include two or more different types of memories.

The RF unit 105 includes a radio signal transceiver 109 that transmits and receives radio signals via the radio antenna 111 (described below) for wireless communication.

The radio antenna 111 transmits and receives radio signals to and from the mobile terminals 12 and 13, other base stations, and an MME (not shown), for example.

According to the embodiment, the radio signal measurer 110 of the DSP 101 includes an RA Preamble determiner 112

(the RA Preamble determiner 112 and the radio signal transceiver 109 correspond to a receiver to receive a first message) to achieve the operations in the embodiment. The RA Preamble determiner 112 receives a special RA Preamble, which was generated by the mobile terminal 12 and indicates that the mobile terminal 12 belongs to the CSG, in addition to normal RA Preambles.

The radio signal measurer 110 of the DSP 101 includes an RA Response transmission determiner 113 (the RA Response transmission determiner 113 and the radio signal transceiver 109 correspond to a transmitter). If the RA Preamble received from the mobile terminal is a special RA Preamble, the RA Response transmission determiner 113 transmits an RA Response to the mobile terminal 12 that transmitted the RA Preamble, without congestion control.

The radio signal measurer 110 of the DSP 110 further includes an MMEC value determiner 116 (the MMEC value determiner 116 and the radio signal transceiver 109 correspond to a receiver to receive a second message). The MMEC value determiner 116 accepts an RRC Connection Request transmitted from a mobile terminal, if the MMEC of the RRC Connection Request is a predetermined special value (e.g., "FF").

The information processor 107 of the CPU 102 includes a CSG mobile-terminal procedure determiner 115. If the MMEC of the RRC Connection Request received from the mobile terminal is the predetermined special value (e.g., "FF"), the CSG mobile-terminal procedure determiner 115 determines the mobile terminal to be a CSG mobile terminal, and continues the RRC connection procedure.

Figure 31:
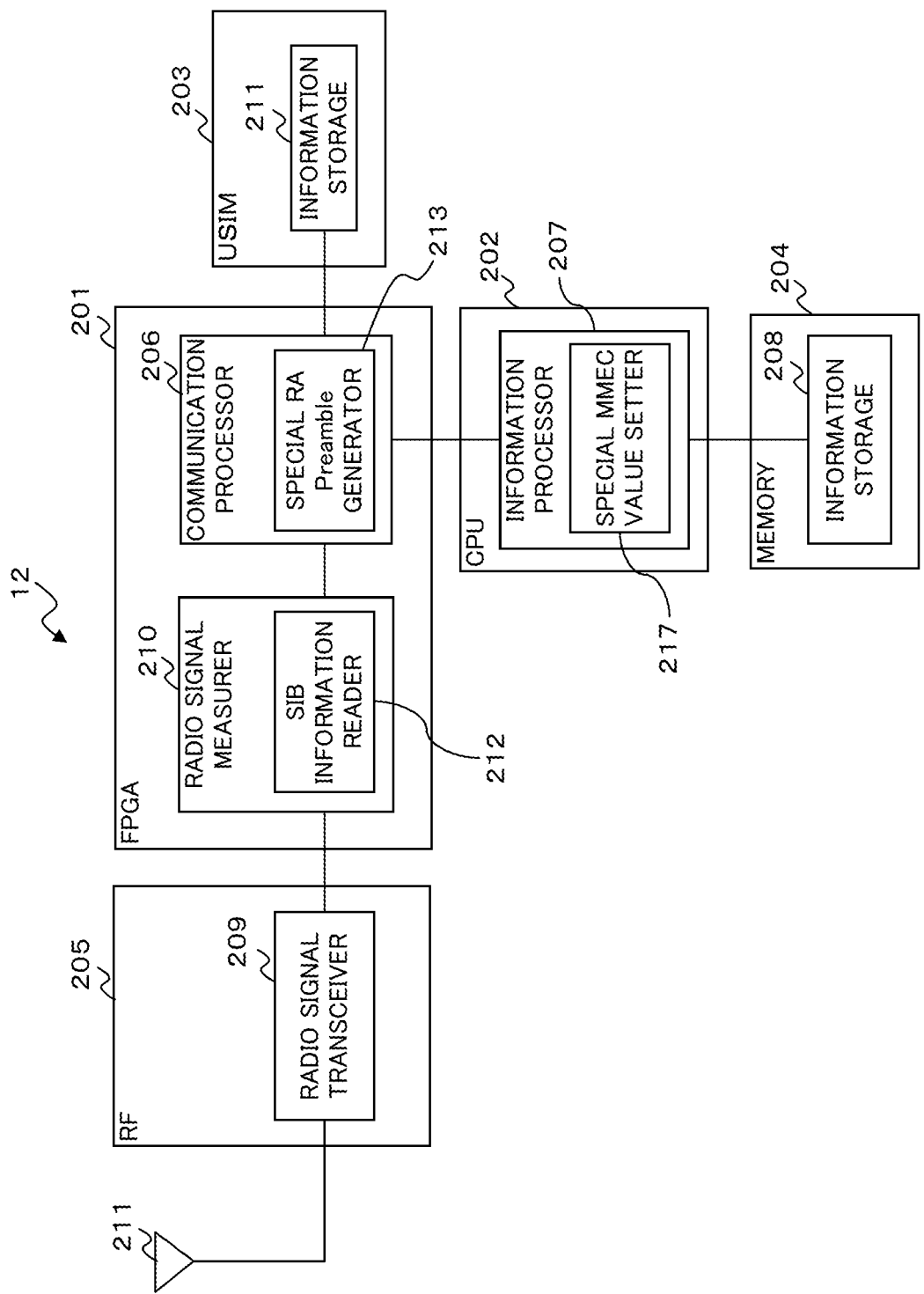
FIG. 31 is a block diagram illustrating an example functional configuration of a mobile terminal according to the third embodiment.

FIG. 31 is a block diagram illustrating an example functional configuration of the mobile terminal 12 according to the third embodiment.

The mobile terminal 12 in FIG. 31 includes an FPGA 201, a CPU 202, a USIM 203, a memory 204, an RF unit 205, and a radio antenna 211, for example.

The FPGA 201 for real-time processing includes a communication processor 206 for a predetermined communication process on radio communication, such as scheduling for radio communication, and a radio signal measurer 210 for measurement of information contained in radio signals.

The CPU 202 for non-real-time processing executes programs, for example, stored in the memory 204 to perform various procedures. The CPU 202 includes an information processor 207 for internal processes of information.

The USIM 203 is an IC card for identifying a user of the mobile terminal and is removable from the mobile terminal 12. The USIM 203 includes an information storage 211 that stores data, such as a telephone number of the mobile terminal 12, information on a contractor, and information on a wireless communication carrier.

The memory 204 includes an information storage 208 that stores information processed in the mobile terminal 12 as required. The memory 204 may be any existing memory, such as RAM, ROM, non-volatile memory, or volatile memory. The memory 204 may include two or more different types of memories.

The RF unit 205 includes a radio signal transceiver 209 (corresponding to a transmitter and a receiver) that transmits and receives radio signals via the radio antenna 211 (described below) for wireless communication.

The radio antenna 211 transmits and receives radio signals to and from the base stations 11 and 14, for example.

According to the third embodiment, the radio signal measurer 210 of the FPGA 201 includes an SIB information reader 212 to achieve the operations in the embodiment. The SIB information reader 212 reads PRACH-ConfigSIB-Hybrid contained in notification information SIB2 transmitted from the hybrid cell base station 11.

The communication processor 206 of the FPGA 201 includes a special RA Preamble generator 213 (corresponding to a first message generator), which generates a special RA Preamble indicating that the mobile terminal 12 belongs to the CSG, on the basis of the parameter read by the SIB information reader 212.

The information processor 207 of the CPU 207 includes a special MMEC value setter 217 (corresponding to a second message generator), which sets the MMEC of an RRC Connection Request to be, for example, a value "FF," instead of an actual MMEC value.

The second embodiment is combined with the first embodiment to achieve the third embodiment. Alternatively, the second embodiment may be combined with the first or second modification of the first embodiment.

Operations

FIG. 32 illustrates the process of connecting to a core network in the mobile terminal 12 according to the third embodiment.

The SIB information reader 212 of the mobile terminal 12 generates a special RA Preamble on the basis of PRACH-ConfigSIB-Hybrid contained in SIB2 in notification information transmitted from the hybrid cell base station 11. The radio signal transceiver 209 of the mobile terminal 12 transmits the RA Preamble to the hybrid cell base station 11 (Step S61).

Upon reception of the special RA Preamble, the RA Preamble determiner 112 of the hybrid cell base station 11 determines the RA Preamble to be unique to mobile terminals belonging to the CSG of the base station 11 (Step S62).

The RA Response transmission determiner 113 of the hybrid cell base station 11 transmits an RA Response to the mobile terminal 12 without congestion control (Step S63).

The special MMEC value setter 217 of the mobile terminal 12 generates an RRC Connection Request containing the MMEC of a predetermined special value (e.g., "FF"). The radio signal transceiver 209 of the mobile terminal 12 transmits the RRC Connection Request to the hybrid cell base station 11 (Step S64). The RRC Connection Request is a message, from a mobile terminal trying to connect to a base station, for requesting the base station to allocate the radio resources.

The MMEC value determiner 116 of the hybrid cell base station 11 determines a predetermined special MMEC value (e.g., "FF") unique to mobile terminals belonging to the CSG of the base station 11 (Step S65).

The CSG mobile-terminal procedure determiner 107 of the hybrid cell base station 11 transmits an RRC Connection Setup to the mobile terminal 12 (Step S66).

The mobile terminal 12 receives the RRC Connection Setup from the hybrid cell base station 11, and sets up an RRC connection and transmits an RRC Connection Setup to the hybrid cell base station 11 after completion of the setup (Step S67).

The hybrid cell base station 11 receives the RRC Connection Setup Complete from the mobile terminal 12, and transmits an Initial User Equipment (UE) message to a core network including a verifier, such as a home subscriber server (HSS) (Step S68). In this process, the hybrid cell base station 11 uses S-TMSI in which the MMEC is replaced by the MMEC of the RRC Connection Setup Complete, instead of the S-TMSI originally contained in the RRC Connection Request received from the mobile terminal 12. This process establishes a signaling connection between the mobile terminal 12 and the core network.

According to the third embodiment, the hybrid cell base station 11 receiving an RA Preamble different from a normal RA Preamble can transmit an RA Response to the mobile terminal without congestion control, unless the radio resources are occupied by another priority terminal 12.

The determination of whether the mobile terminal 12 belongs to the CSG also depends on a special value as the MMEC of an RRC Connection Request that the mobile terminal 12 will transmit later. This operation can improve the accuracy of the determination of whether a mobile terminal belongs to the CSG, and leads to more effective use of the radio resources.

[4] Others

In the above-described embodiments and their modifications, the DSP 101 of the hybrid cell base station 11 executes programs, to function as the RA Preamble determiner 112, 112', or 112", the RA Response transmission determiner 113, 113', or 113", and the MMEC value determiner 116.

The CPU 107 of the hybrid cell base station 11 executes a program, to function as the CSG mobile-terminal procedure determiner 115.

The FPGA 201 of the mobile terminal 12 executes programs, to function as the SIB information reader 212 or 212' and the special RA Preamble generator 213, 213', or 213".

The CPU 207 of the mobile terminal 12 executes programs, to function as the pre-shared PRACH Config reader 214 and the special MMEC value setter 217.

The programs for these functions are each recorded in a computer-readable recording medium, such as flexible disk, CD (e.g., CD-ROM, CD-R, and CD-RW), DVD (e.g., DVD-ROM, DVD-RAM, DVD-R, DVD+R, DVD-RW, and DVD+RW), magnetic disk, optical disk, or magneto-optical disk. A program to be used is read by a computer from the recording medium, and transferred into an internal storage unit or an external storage unit. Alternatively, the program may be prerecorded in a storage unit (recording medium), such as magnetic disc, optical disk, or magneto-optical disk, and provided from the storage unit to the computer via a communication path.

To achieve the individual functions, the processors (the DSP, the FPGA, and the CPUs in the above-described embodiments and their modifications) of the computer execute the programs stored in the internal storage unit (the memories and the USIM in the embodiments and their modifications). Alternatively, the computer may read the programs stored in a recording medium and execute the programs.

The individual functions of the hybrid cell base station 11 are shared by the DSP 101 and the CPU 102 in the above explanation. Alternatively, all the functions may be performed by either one of the DSP 101 and the CPU 102.

The individual functions of the mobile terminal 12 are shared by the FPGA 201 and the CPU 202 in the above explanation. Alternatively, all the functions may be performed by either one of the FPGA 201 and the CPU 2022.

In the embodiments, the computer is a concept including hardware and an operating system, and corresponds to hardware operating under the control of an operating system. If an application program alone operates hardware without any operating system, the computer corresponds to the hardware itself. The hardware at least includes a processor such as CPU, and means for reading computer programs stored in a recording medium. In the embodiments and their modifications, the hybrid cell base station 11 and the mobile terminal 12 function as the computer.

The above-described aspects can achieve overall effective use of the radio resources of a base station, while prioritizing a mobile terminal over other mobile terminals in establishing a connection.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A mobile communication system comprising:
   a plurality of mobile terminals; and
   a base station having a cell for which a closed subscriber group is set, the closed subscriber group including a mobile terminal being prioritized over another mobile terminal in quality of service control, wherein
   the base station broadcasts first information for a mobile terminal belonging to the closed subscriber group and second information for a mobile terminal not belonging to the closed subscriber group,
   each mobile terminal of the plurality of mobile terminals,
      when the mobile terminal belongs to the closed subscriber group, generates a first random access preamble based on the first information and transmits the generated first random access preamble, and
      when the mobile terminal does not belong to the closed subscriber group, generates a second random access preamble different from the first random access preamble based on the second information and transmits the generated second random access preamble,
   the base station receives a random access preamble from the mobile terminal,
   the base station, in a congestion state,
      when the received random access preamble is the first random access preamble, transmits a random access response to the mobile terminal, and
      when the received random access preamble is the second random access preamble, does not transmit a random access response to the mobile terminal,
   the mobile terminal, upon receiving the random access response,
      when the mobile terminal belongs to the closed subscriber group, transmits a first radio resource control connection request including a predetermined first value as an Mobility Management Entity (MME) code, and
      when the mobile terminal does not belong to the closed subscriber group, transmits a second radio resource control connection request including a second value different from the first value as the MME code,
   the base station receives a radio resource control connection request from the mobile terminal, and
   the base station, in the congestion state,
      when the received radio resource control connection request includes the first value as the MME code, transmits a radio resource control connection setup to the mobile terminal, and
      when the received radio resource control connection request includes the second value as the MME code, does not transmit a radio resource control connection setup to the mobile terminal.

2. The mobile communication system according to claim 1, wherein the base station comprises a storage to store the first information.

3. The mobile communication system according to claim 1, wherein the mobile terminal comprises a storage to store the first information.

4. A mobile terminal communicating with a base station having a cell for which a closed subscriber group is set, the closed subscriber group including a mobile terminal being prioritized over another mobile terminal in quality of service control, the mobile terminal comprising:
 a receiver to receive first information for a mobile terminal belonging to the closed subscriber group and second information for a mobile terminal not belonging to the closed subscriber group, the first information and the second information having been broadcast by the base station; and
 a transmitter,
  when the mobile terminal belongs to the closed subscriber group, to generate a first random access preamble based on the first information and to transmit the generated first random access preamble, and
  when the mobile terminal does not belong to the closed subscriber group, to generate a second random access preamble different from the first random access preamble based on the second information and to transmit the generated second random access preamble, wherein
 the transmitter, upon receiving a random access response from the base station,
  when the mobile terminal belongs to the closed subscriber group, transmits a first radio resource control connection request including a predetermined first value as an Mobility Management Entity (MME) code, and
  when the mobile terminal does not belong to the closed subscriber group, transmits a second radio resource control connection request including a second value different from the first value as the MME code.

5. The mobile terminal according to claim 4, further comprising a storage to store the first information, wherein the transmitter generates the first random access preamble based on the first information stored in the storage.

6. The mobile terminal according to claim 5, wherein the storage is removable from the mobile terminal.

7. A storage unit for the mobile terminal according to claim 5, the storage unit comprising a storage to store the first information, the storage having a directory structure to retain the first information.

8. A base station having a cell for which a closed subscriber group is set, the closed subscriber group including a mobile terminal being prioritized over another mobile terminal in quality of service control, the base station comprising:
 a transmitter to broadcast first information for a mobile terminal belonging to the closed subscriber group and second information for a mobile terminal not belonging to the closed subscriber group; and
 a receiver to receive a random access preamble from the mobile terminal, wherein
 the transmitter, in a congestion state,
  when the received random access preamble is a first random access preamble, which is generated based on the first information by the mobile terminal, transmits a random access response to the mobile terminal, and
  when the received random access preamble is a second random access preamble, which is generated based on the second information by the mobile terminal, different from the first random access preamble, does not transmit a random access response to the mobile terminal,
 the receiver receives a radio resource control connection request from the mobile terminal, and
 the transmitter, in the congestion state,
  when the received radio resource control connection request includes a predetermined first value as an Mobility Management Entity (MME) code, transmits a radio resource control connection setup to the mobile terminal, and
  when the received radio resource control connection request includes a second value different from the first value as the MME code, does not transmit a radio resource control connection setup to the mobile terminal.

9. The base station according to claim 8, further comprising a storage to store the first information, wherein the transmitter broadcasts the first information stored in the storage.

* * * * *